United States Patent
Kondo et al.

(10) Patent No.: US 8,066,093 B2
(45) Date of Patent: Nov. 29, 2011

(54) POWER STEERING SYSTEM, SPEED REDUCTION MECHANISM AND BEARING HOLDER

(75) Inventors: Yoshimori Kondo, Atsugi (JP); Kohtaro Shiino, Isehara (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 12/373,161

(22) PCT Filed: Jul. 12, 2007

(86) PCT No.: PCT/JP2007/063903
§ 371 (c)(1),
(2), (4) Date: Jan. 9, 2009

(87) PCT Pub. No.: WO2008/007736
PCT Pub. Date: Jan. 17, 2008

(65) Prior Publication Data
US 2009/0255751 A1 Oct. 15, 2009

(30) Foreign Application Priority Data

Jul. 12, 2006 (JP) ................................. 2006-191177

(51) Int. Cl.
*B62D 5/04* (2006.01)
(52) U.S. Cl. .......................... 180/444; 180/443; 180/446
(58) Field of Classification Search .................. 180/443, 180/444, 446
See application file for complete search history.

(56) References Cited

U.S. PATENT DOCUMENTS

| | | | |
|---|---|---|---|
| 5,044,454 A | * | 9/1991 | Kanazawa et al. ............ 180/445 |
| 6,491,131 B1 | * | 12/2002 | Appleyard .................... 180/444 |
| 6,763,738 B1 | * | 7/2004 | Tsutsui et al. ............ 74/388 PS |
| 6,988,582 B2 | | 1/2006 | Kitami et al. |
| 7,100,734 B2 | * | 9/2006 | Segawa ......................... 180/444 |
| 7,360,467 B2 | * | 4/2008 | Segawa et al. .................. 74/425 |
| 2004/0084865 A1 | | 5/2004 | Kitami et al. |

FOREIGN PATENT DOCUMENTS

| | | |
|---|---|---|
| DE | 1 918 129 A1 | 8/1970 |
| DE | 10 2004 054 510 A1 | 5/2006 |
| DE | 603 04 231 T2 | 12/2006 |
| JP | 2002-518242 A | 6/2002 |
| JP | 2002-187561 A | 7/2002 |
| JP | 2004-345444 A | 12/2004 |
| JP | 2004345444 * | 12/2004 |
| JP | 2005-104366 A | 4/2005 |
| JP | 2005-162116 A | 6/2005 |
| JP | 2006-027321 A | 2/2006 |
| JP | 2006-027368 A | 2/2006 |
| JP | 2006-151043 A | 6/2006 |

* cited by examiner

*Primary Examiner* — Anne Marie Boehler
*Assistant Examiner* — Michael Stabley
(74) *Attorney, Agent, or Firm* — Foley & Lardner LLP

(57) ABSTRACT

A power steering system includes a wormshaft housed in a shaft housing portion and rotatably supported at one end by a bearing, a worm wheel adapted to mesh with the wormshaft, a bottomed, cylindrical bearing holder configured to enclose and fit onto the bearing for holding the bearing, and a preloading means located in the bearing holder for preloading the bearing in a direction of meshed-engagement of the worm gear. An adjustment-mechanism housing portion is formed at one end of the shaft housing portion for housing and retaining the bearing holder. A restriction wall is formed in the adjustment-mechanism housing portion for restricting a movement of the bearing holder. The preloading means includes a preload portion formed integral with the bearing holder, for forcing the bearing in the direction of meshed-engagement by a force of resiliency of the preload portion, thus ensuring sufficient accuracy of meshed-engagement without complicated machining.

16 Claims, 19 Drawing Sheets

POWER STEERING SYSTEM, SPEED REDUCTION MECHANISM AND BEARING HOLDER

TECHNICAL FIELD

The present invention relates to an electric power steering system for an automotive vehicle, and specifically to an electric power steering system configured to be able to adjust a backlash between meshing gears installed in a speed reduction mechanism, mainly constructed by a worm gear, which gear can be applied to the power steering system.

BACKGROUND ART

For instance, an electric power steering system, which employs a speed reduction mechanism comprised of a worm wheel provided on the outer periphery of a steering shaft and a wormshaft, which is in meshed-engagement with the worm wheel and whose one axial end is connected to an electric motor, is well known as a typical power steering system. The electric power steering system is configured to assist a steering force by a driving force, produced by the electric motor and transmitted through the speed reduction mechanism, in response to a measure of torque in the steering shaft.

In such an electric power assisted steering system, in the presence of a large backlash between the toothed portion of the worm wheel and the toothed portion of the wormshaft meshing each other, there exists a problem with hammering noise generated between the worm wheel and the wormshaft meshing each other due to vibrations transmitted through road wheels. To avoid this problem, the following patent document 1 has proposed and disclosed a power steering system, capable of adjusting a backlash of a speed reduction mechanism.

This type of power steering system includes a bearing fitted onto the outer periphery of the other axial end of the wormshaft, which wormshaft is housed in a shaft housing portion defined in a housing in such a manner as to penetrate the inside of the housing for rotatably supporting the other axial end of the wormshaft, a preloading member adapted to force the wormshaft in the direction of the one axial end of the wormshaft (that is, toward the electric-motor side) through the bearing, an adjusting screw threadably engaged with the opening end of the shaft housing portion to which the other axial end of the wormshaft faces, such that the adjusting screw forces the preloading member toward the bearing for adjusting the magnitude of a preload of the preloading member by turning the adjusting screw, and a resilient: biasing means installed on the outer circumference of the bearing and adapted to act on the bearing to force the other axial end of the wormshaft in the direction perpendicular to the axis of the wormshaft through the bearing, so as to bias the other end of the wormshaft in the direction of meshed-engagement with the worm wheel. The previously-noted biasing means is comprised of an ring, which is fitted and retained in an annular groove, cut or formed in the inner peripheral surface of the opening end of the shaft housing portion. The O ring is laid out to face the outer peripheral surface of the bearing. The center of the annular groove when viewed in the radial direction is slightly offset from the center of the shaft housing portion when viewed in the radial direction, toward the worm-wheel side, thus enabling the other axial end of the wormshaft to be biased toward the worm-wheel side through the bearing by virtue of an elastic force of the O ring.

With the previously-noted arrangement, the magnitude of a preload of the preloading member can be adjusted by forward/backward rotary motion of the adjusting screw. Additionally, the elastic force of the O ring can be adjusted by selection of the cross-sectional dimension of the O ring and the eccentricity of the center of the groove when viewed in the radial direction with respect to the center of the shaft housing portion when viewed in the radial direction, and whereby the desired amount of biased displacement of the wormshaft in the direction of meshed-engagement with the worm wheel can be adjusted. In this manner, it is possible to realize an appropriate backlash between the toothed portion of the worm wheel and the toothed portion of the wormshaft meshing each other. Patent document 1: JP2002-518242TT (see FIG. 1 thereof)

DISCLOSURE OF THE INVENTION

Task Solved by the Invention

In the typical power steering system as discussed previously, the biasing means was constructed by fitting and retaining the O ring in the groove, cut or formed in the inner peripheral surface of the opening end of the shaft housing portion. The groove is cut or formed in only the predetermined axial position of the inner peripheral surface of the shaft housing portion. Additionally, the groove must be formed or arranged in such a manner as to be eccentric to the shaft housing portion. Therefore, the system has difficulty in ensuring the sufficient machining accuracy. The complicated machining of the eccentric groove leads to the problem of reduced productivity, thus resulting in higher manufacturing costs.

As set forth above, the system has difficulty in ensuring a sufficient machining accuracy of the groove, thus resulting in individual differences of elastic forces produced by O rings installed in place. As a result, it is difficult to create a desired elastic force. This leads to the technical problem of the difficulty of achieving high-precision meshed-engagement between the toothed portion of the worm wheel and the toothed portion of the wormshaft.

It is, therefore, in view of the previously-described technical disadvantages of the prior art, an object of the invention to provide a power steering system configured to be able to ensure a sufficient accuracy of meshed-engagement between a toothed portion of a worm wheel and a toothed portion of a wormshaft, without requiring any complicated machining to be made to the inner periphery of a housing.

Means to Solve the Task

The invention as set forth in claim 1 is characterized in that, a power steering system comprises a worm wheel linked to a steering shaft, a wormshaft housed in a housing and adapted to mesh with the worm wheel, a bearing adapted to rotatably support one end of the wormshaft, a bearing holder having a substantially cylindrical holding portion formed to enclose and fit onto the bearing for holding the bearing, and a preloading means located in the bearing holder for preloading the bearing in a direction that the wormshaft and the worm wheel are brought into meshed-engagement with each other, wherein a shaft housing portion is defined in the housing for housing the wormshaft inside of the housing, a holder housing portion is provided at one axial end of the shaft housing portion for housing the bearing holder, and the holder housing portion has a restriction wall arranged coaxially with the shaft housing portion for restricting a movement of the bearing holder at least in an opposite direction, which is opposite to the direction that the wormshaft and the worm wheel are brought into meshed-engagement with each other, and in a direction perpendicular to the opposite direction.

According to the above-mentioned invention, the bearing holder is configured to be retained by a wall surface of the restriction wall of the holder housing portion, which restriction wall is arranged coaxially with the shaft housing portion. Therefore, it is possible to simultaneously machine the restriction wall, together with the shaft housing portion, by drilling. Accordingly, both the shaft housing portion and the restriction wall can be rapidly easily machined, thus ensuring reduced machining time and costs.

Furthermore, by virtue of the previously-noted simultaneous machining, it is possible to enhance the machining accuracy of the restriction wall of the holder housing portion relative to the shaft housing portion, thus ensuring a high-precision relative-position relationship between the bearing holder and the bearing, and consequently enabling an effective preloading action by the preloading means of the bearing holder. This also enhances the accuracy of meshed-engagement between the toothed portion of the wormshaft and the toothed portion of the worm wheel.

The invention as set forth in claim 2 is characterized in that, the preloading means comprises a preload portion formed integral with the holding portion of the bearing holder to permit elastic deformation of the preload portion, for forcing the bearing in the direction that the wormshaft and the worm wheel are brought into meshed-engagement with each other, by a force of resiliency of the preload portion.

According to the above-mentioned invention, the holding portion provided to hold the bearing and the preload portion provided to preload the bearing are integrally formed each other, and whereby it is possible to enhance the accuracy of relative position between the preload portion and the bearing. This enables permanent application of an appropriate preload acting on the wormshaft in the direction of meshed-engagement with the worm wheel. As a result of this, it is possible to enhance the accuracy of meshed-engagement between the toothed portion of the wormshaft and the toothed portion of the worm wheel.

The invention as set forth in claim 3 is characterized in that, the bearing holder is formed of a synthetic resin.

According to the above-mentioned invention, as a matter of course, it is possible to easily form the bearing holder. In particular, even when an excessively large input load, transmitted from the worm-wheel side, acts on the wormshaft, it is possible to prevent impact-noise caused by abutment of the preload portion, which is brought into abutted-engagement with the restriction wall or the holding portion due to the input load.

The invention as set forth in claim 4 is characterized in that, the system further comprises a preload member adapted to be kept in resilient-contact with an outer surface of the preload portion, for assisting a preload of the preload portion.

According to the above-mentioned invention, it is possible to increase the preload of the preload portion, thus suppressing the force of resiliency of the preload portion from deteriorating due to repeated elastic-deformations of the preload portion. This enhances the durability of the preload portion, thus insuring a more stable preload acting on the wormshaft in the direction of meshed-engagement. By the addition of the preload member, it is possible to preload the wormshaft by means of two preloading means having spring stiffnesses differing from each other, thus enhancing the degree of freedom of adjustment of the preload. Accordingly, it is possible to set the preload to a more appropriate magnitude.

The invention as set forth in claim 5 is characterized in that, the bearing holder is formed into a substantially cylindrical shape by both the holding portion and the preload portion, and the preload member comprises an O ring fitted to an outer circumference of the bearing holder.

According to the above-mentioned invention, the O ring is simply fitted to the outer circumference of the bearing holder. Thus, it is possible to easily add the preload member without additional machining to be made to the holder housing portion, in other words, without causing the increased machining man-hour of the holder housing portion.

The invention as set forth in claim 6 is characterized in that, the aforementioned preload member is configured to apply a preload to the preload portion by a radial shrinking action of the O ring.

According to the above-mentioned invention, it is possible to suppress a change of the resiliency of the O ring deteriorated with age to a minimum.

The invention as set forth in claim 7 is characterized in that, the O ring is fitted and retained in grooves cut and formed in respective outer circumferences of the holding portion and the preload portion.

According to the above-mentioned invention, it is possible to lay out the preload member without upsizing the radial dimension of the bearing holder. This eliminates the necessity of extra machining to be made to the inner periphery of the holder housing portion. In other words, it is possible to add the preload member without causing the increased machining man-hour of the holder housing portion. Additionally, in the case of the above-mentioned installing structure, it is possible to certainly retain the O ring on the bearing holder, and therefore there is no risk that the O ring falls away from the bearing holder.

The invention as set forth in claim 8 is characterized in that, the bearing holder has a bottom wall and a peripheral wall formed to extend upward from a circumference of the bottom wall for retaining an outer peripheral surface of the bearing, and the preload portion is supported by the bottom wall of the holding portion via a pair of slits, which slits are radially cut out and formed to range from the peripheral wall of the bearing holder to a predetermined position of the bottom wall.

According to the above-mentioned invention, it is possible to freely set a radial displacement of the preload portion by varying only the depth-of-cut of each of the slits. Additionally, it is possible to adjust the stiffness of the preload portion relative to the holding portion, that is, the preload created by the preload portion, by varying only the interval between the slits. This contributes to the increased design flexibility of the bearing holder.

The invention as set forth in claim 9 is characterized in that, the pair of slits are formed such that a circumferential width of the preload portion gradually enlarges radially outward from a basal-end portion of the preload portion formed integral with the bottom wall of the holding portion.

According to the above-mentioned invention, the interval of the slits at the basal-end side of the preload portion is set to a small value and the interval of the slits at the free-end side of the preload portion, that is, the interval of the slits at the outermost-end side of the preload portion, is set to a large value. Thus, it is possible to enlarge the area of the peripheral wall of the preload portion, while ensuring an appropriate preload created by the preload portion. By virtue of the enlarged area, it is possible to reduce a bearing pressure or a bearing stress acting on the peripheral wall of the preload portion and arising from an excessive input load transmitted from the worm wheel to the wormshaft. Therefore, even when the peripheral wall of the preload portion is jammed between the bearing and the restriction wall with the input load, there is no risk of causing any damage to the peripheral wall of the preload portion. Furthermore, it is possible to enhance the peripheral-wall's ability to hold the bearing by enlarging the area of the preload portion, thus enabling the bearing to be certainly held at the central side of the bearing holder. As a result of this, it is possible to enhance the accuracy of meshed-engagement between the toothed portion of the wormshaft and the toothed portion of the worm wheel.

The invention as set forth in claim 10 is characterized in that, a stiffness of a basal-end portion of a bottom of the preload portion is set to be less than a stiffness of an outermost-end portion of the bottom of the preload portion.

According to the above-mentioned invention, it is possible to ensure an appropriate total stiffness of the preload portion, while ensuring an appropriate resiliency of the preload portion, by lowering only the stiffness of the basal-end portion of the bottom of the preload portion.

The invention as set forth in claim 11 is characterized in that, the preload portion has a plurality of spring-stiffness characteristic values for a load-deflection characteristic with regard to an input load.

According to the above-mentioned invention, even at a normal steering mode during flat-road driving, or even in the presence of action of an excessively large input load from the road surface to the steering system, it is possible to provide the deflection characteristic of the preload portion, suited for each of the steering situations. Thus, it is possible to constantly apply an appropriate preload to the wormshaft in the direction of meshed-engagement with the worm wheel. As a result, it is possible to enhance the accuracy of meshed-engagement between the toothed portion of the wormshaft and the toothed portion of the worm wheel.

The invention as set forth in claim 12 is characterized in that, a speed reduction mechanism comprises a first gear housed in a housing and rotated by an actuator, a second gear adapted to mesh with the first gear, a bearing adapted to rotatably support at least one end of the first gear, a bearing holder having a substantially cylindrical holding portion formed to enclose and fit onto the bearing for holding the bearing, a preloading means located in the bearing holder for preloading the bearing in a direction that the first gear and the second gear are brought into meshed-engagement with each other, wherein a first gear housing portion is defined in the housing for housing the first gear inside of the housing, a holder housing portion is provided at one axial end of the first gear housing portion for housing the bearing holder, and the holder housing portion has a restriction wall arranged coaxially with the first gear housing portion for restricting a movement of the bearing holder at least in an opposite direction, which is opposite to the direction that the first gear and the second gear are brought into meshed-engagement with each other, and in a direction perpendicular to the opposite direction.

According to the above-mentioned invention, the bearing holder is configured to be retained by a wall surface of the restriction wall of the holder housing portion, which restriction wall is arranged coaxially with the first gear housing portion. Therefore, it is possible to simultaneously machine the restriction wall, together with the first gear housing portion, by drilling. Accordingly, both the first gear housing portion and the restriction wall can be rapidly easily machined, thus ensuring reduced machining time and costs.

Furthermore, by virtue of the previously-noted simultaneous machining, it is possible to enhance the machining accuracy of the restriction wall of the holder housing portion relative to the first gear housing portion, thus ensuring a high-precision relative-position relationship between the bearing holder and the bearing, and consequently enabling an effective preloading action by the preloading means of the bearing holder. This also enhances the accuracy of meshed-engagement between the toothed portion of the first gear and the toothed portion of the second gear.

The invention as set forth in claim 13 is characterized in that, the bearing holder has a restriction portion provided to restrict an axial movement of the first gear toward the one end of the first gear through the bearing.

According to the above-mentioned invention, when installing the bearing holder in the housing, it is possible to easily assemble the bearing holder in the holder housing portion in a predetermined axial position by a restricting action of the restriction portion, by only the insertion of the bearing holder from the one end of the first gear into the first gear holding portion and only the pushing action of the bearing holder through the bearing installed on the first gear. This contributes to the enhanced assembling efficiency of the speed reduction mechanism.

The invention as set froth in claim 14 is characterized in that, the first gear comprises a wormshaft, whereas the second gear comprises a worm wheel, and the worm wheel is formed of a synthetic resin.

According to the above-mentioned invention, the worm wheel, which is the second gear, is formed of a synthetic resin, thus ensuring smooth meshed-engagement of a worm gear, constructed by the first gear and the second gear, and thereby reduces meshing noise.

The invention as set forth in claim 15 is characterized in that, a preload member is further installed on the bearing holder, for assisting a preload of the preload means.

According to the above-mentioned invention, by the addition of the preload member, it is possible to increase the preload of the preload means. Additionally, it is possible to preload the wormshaft by means of two preloading means having spring stiffnesses differing from each other, thus enhancing the degree of freedom of adjustment of the preload. Hence, it is possible to set the preload to a more appropriate magnitude. Accordingly, it is possible to constantly apply an appropriate preload to the wormshaft in the direction of meshed-engagement with the worm wheel. As a result, it is possible to enhance the accuracy of meshed-engagement between the toothed portion of the wormshaft and the toothed portion of the worm wheel.

The invention as set forth in claim 16 is characterized in that, the preload member comprises an O ring fitted to an outer circumference of the bearing holder. According to the above-mentioned invention, the O ring is simply fitted to the outer circumference of the bearing holder. Thus, it is possible to easily add the preload member without additional machining to be made to the holder housing portion, in other words, without causing the increased machining man-hour of the holder housing portion.

The invention is characterized in that, a bearing holder for holding a bearing installed on one end of a wormshaft adapted to mesh with a worm wheel, comprises a substantially cylindrical holding portion formed to enclose and fit onto the bearing and housed and retained in a holder housing portion, which is arranged coaxially with a shaft housing portion defined in the housing for housing the wormshaft, a guide portion provided in an inner circumference of the holding portion for permitting a movement of the bearing in a direction that the wormshaft and the worm wheel are brought into meshed-engagement with each other, and for restricting a movement of the bearing in a direction perpendicular to the direction of meshed-engagement, and a preloading means provided for preloading the bearing in the direction that the wormshaft and the worm wheel are brought into meshed-engagement with each other.

According to the above-mentioned invention, the bearing holder is formed coaxially with the shaft housing portion. Additionally, the bearing holder is configured to be retained by a wall surface of the restriction wall of the holder housing portion, which restriction wall has a substantially same curvature as the holding portion of the bearing holder. Therefore, it is possible to simultaneously machine the restriction wall, together with the shaft housing portion, by drilling.

Accordingly, both the restriction wall and the shaft housing portion can be rapidly easily machined, thus ensuring reduced machining time and costs. Furthermore, by virtue of the previously-noted simultaneous machining, it is possible to enhance the machining accuracy of the restriction wall of the holder housing portion relative to the shaft housing portion, thus ensuring a high-precision relative-position relationship between the bearing holder and the bearing, and consequently enhancing the accuracy of meshed-engagement between the toothed portion of the wormshaft and the toothed portion of the worm wheel.

The invention is characterized in that, the preloading means comprises a preload portion formed integral with the holding portion to permit elastic deformation of the preload portion, for forcing the bearing in the direction that the wormshaft and the worm wheel are brought into meshed-engagement with each other, by a force of resiliency of the preload portion. According to the above-mentioned invention, the holding portion provided to hold the bearing and the preload portion provided to preload the bearing are integrally formed each other, and whereby it is possible to enhance the accuracy of relative position between the preload portion and the bearing. This enables permanent application of an appropriate preload acting on the wormshaft in the direction of meshed-engagement with the worm wheel. As a result of this, it is; possible to enhance the accuracy of meshed-engagement between the toothed portion of the wormshaft and the toothed portion of the worm wheel.

The invention is characterized in that, the bearing holder has a bottom wall and a peripheral wall formed to extend upward from a circumference of the bottom wall for retaining an outer peripheral surface of the bearing, and the preload portion is supported by the bottom wall of the holding portion via a pair of slits, which slits are radially cut out and formed to range from the peripheral wall of the bearing holder to a predetermined position of the bottom wall.

According to the above-mentioned invention, it is possible to freely set a radial displacement of the preload portion by varying only the depth-of-cut of each of the slits. Additionally, it is possible to adjust the stiffness of the preload portion relative to the holding portion, that is, the preload created by the preload portion, by varying only the interval between the slits. This contributes to the increased design flexibility of the bearing holder.

The invention is characterized in that, the pair of slits are formed such that a circumferential width of the preload portion gradually enlarges radially outward from a basal-end portion of the preload portion formed integral with the bottom wall of the holding portion.

According to the above-mentioned invention, the interval of the slits at the basal-end side of the preload portion is set to a small value and the interval of the slits at the free-end side of the preload portion, that is, the interval of the slits at the outermost-end side of the preload portion, is set to a large value. Thus, it is possible to enlarge the area of the peripheral wall of the preload portion, while ensuring an appropriate preload created by the preload portion. By virtue of the enlarged area, it is possible to reduce a bearing pressure or a bearing stress acting on the peripheral wall of the preload portion and arising from an excessive input load transmitted from the worm wheel to the wormshaft. Therefore, even when the peripheral wall of the preload portion is jammed between the bearing and the inner wall of the holder housing portion with the input load, there is no risk of causing any damage to the peripheral wall of the preload portion. Furthermore, it is possible to enhance the peripheral-wall's ability to hold the bearing by enlarging the area of the preload portion, thus enabling the bearing to be certainly held at the central side of the bearing holder. As a result of this, it is possible to enhance the accuracy of meshed-engagement between the toothed portion of the wormshaft and the toothed portion of the worm wheel.

DESCRIPTION OF THE PREFERRED EMBODIMENTS

The details of the power steering systems and their configurations of the respective embodiments are hereinafter described in reference to the drawings. Referring to the drawings, the power steering system of each of the embodiments is exemplified in a rack-and-pinion power steering device of an automotive vehicle.

FIGS. 1-13 show the power steering system and its configuration of the first embodiment, made according to the invention. As shown in FIG. 13, the power steering system 1 is provided with a steering shaft 3 connected to a steering wheel 2, an input shaft 4 linked to steering shaft 3, an output shaft 5, which is formed at its top end with a pinion gear and arranged coaxially with input shaft 4 and linked through a torsion bar (not shaft) to the input shaft so that relative rotation of the output shaft to the input shaft is permitted, a rack shaft 6 having a rack gear formed over a given length in the axial direction of the rack shaft and adapted to mesh with the pinion gear of output shaft 5, and tie rods 7, 7 adapted to link both ends of rack shaft 6 and steering knuckles (not shown) linked to respective road wheels WL, WR.

As is generally known, when steering wheel 2 is turned, input shaft 4 rotates synchronously with rotary motion of steering shaft 3 and thus the torsion bar is twisted. Output shaft 5 begins to rotate, following rotary motion of input shaft 4 by an elastic force of the torsion bar. Then, rotary motion of output shaft 5 is converted into linear motion of rack shaft 6 by the rack-and-pinion structure. Rack shaft 6 moves leftward or rightward, and thus the knuckles are pulled leftward or rightward by tie rods 7, 7. In this manner, the road wheels WL, WR are steered.

The previously-noted power steering system 1 is also provided with a housing 11 arranged around a portion that input shaft 4 and output shaft 5 are joined to each other, a torque sensor 8 housed in housing 11 for detecting a steering torque based on a displacement of relative rotation of output shaft 5 to input shaft 4, an electric motor 9 adapted to apply an assistance torque based on a detection result of torque sensor 8, and a speed reduction mechanism 10 configured to transmit a driving force produced by electric motor 9 to output shaft 5. Thus, the steering force can be assisted by application of the assistance torque determined based on the steering torque in input shaft 4 to output shaft 5.

As shown in FIG. 12, the previously-noted housing 11 has a recessed groove formed in its upper end face. A control circuit 13, which is configured to control the driving state of electric motor 9, is housed in the recessed groove. The opening end of the housing is closed by a side housing 12.

The previously-noted speed reduction mechanism 10 is linked to the lower end (viewing FIG. 12) of a driving shaft 9a of electric motor 9. The speed reduction mechanism is mainly constructed by a wormshaft 14 having a toothed portion (a worm) 14a formed over a given length in the axial direction of the wormshaft, and a worm wheel 15, which worm wheel is fixedly connected onto the outer periphery of output shaft 5 and having a toothed portion 15a, formed on its outer periphery and kept in meshed-engagement with the toothed portion 14a of wormshaft 14.

The previously-noted housing 11 has a shaft housing portion 16 formed therein and arranged coaxially with the driving shaft 9a of electric motor 9 for housing wormshaft 14 in such a manner as to penetrate the inside of the housing, and a gear housing portion 17 formed in the housing for housing worm wheel 15, such that a given circumferential section of worm wheel 15 faces toward shaft housing portion 16.

The lower end (viewing FIG. 12) of wormshaft 14 is rotatably supported by means of a first bearing 18a, which is housed in the opening of the lower end of shaft housing portion 16. On the other hand, the upper end of the wormshaft is rotatably supported by means of a second bearing 18b, which is housed in the opening of the upper end of shaft housing portion 16.

As shown in FIG. 1, the lower end of wormshaft 14 is formed with a radially-outward protruding, stepped restriction portion 14b for restricting an axially-inward movement (an upper movement) of first bearing 18a. The lower end of the wormshaft is also formed with an annular groove 14c cut or formed in its outer circumference and spaced apart from restriction portion 14b axially outward by a specified distance. A snap ring 19 is fitted into annular groove 14c for restricting a downward movement of the first bearing. First bearing 18a is retained at the lower end of wormshaft 14 in a state where the first bearing is sandwiched between restriction portion 14b and snap ring 19.

The axially-outside sidewall of two opposing sidewalls, constructing annular groove 14c, is formed as a tapered sidewall, which is tapered and widened radially outward. First bearing 18a is retained in a state where the first bearing is pushed against restriction portion 14b by snap ring 19 fitted into annular groove 14c. As shown in FIGS. 1 and 12, the lower end opening of shaft housing portion 16 is formed with a stepped adjustment-mechanism housing portion (a holder housing portion in the system of the invention) 40, which extends downward from shaft housing portion 16 and whose bore is enlarged as compared to the shaft housing portion. The lower end of wormshaft 14 faces to the adjustment-mechanism housing portion. A backlash adjustment mechanism 20 is housed in adjustment-mechanism housing portion 40, for adjusting a backlash between the toothed portion 14a of wormshaft 14 and the toothed portion 15a of worm wheel 15 via first bearing 18a. This backlash change may occur due to individual differences of machining accuracies of tooth flanks of the toothed portions and tooth-flank wears.

The previously-noted adjustment-mechanism housing portion 40 is arranged coaxially with shaft housing portion 16, and formed integral with the peripheral wall of shaft housing portion 16. The adjustment-mechanism housing portion is defined by a restriction wall 40a having an inner peripheral surface having a substantially circular shape in lateral cross-section and having a slightly larger curvature than that of a holding portion 25 of a bearing holder 21 (described later).

Backlash adjustment mechanism 20 is comprised of bearing holder 21, which is loosely fitted into restriction wall 40a of adjustment-mechanism housing portion 40 and configured to enclose and fit onto first bearing 18a for holding the bearing such that the bearing holder is fitted from the lower end of the first bearing, an O ring, serving as a preload member and fitted to the outer circumference of bearing holder 21, and a plug member 23 provided for closing the opening end of adjustment-mechanism housing portion 40 and for restricting an axial movement of bearing holder 21.

As shown in FIGS. 1 and 3, the previously-noted bearing holder 21 is formed of a synthetic resin. The bearing holder is formed into a bottomed, substantially cylindrical shape having an inside diameter r1 dimensioned to be greater than an outside diameter R1 of first bearing 18a. The bearing holder has a pair of slits 24, 24, which slits are cut out and formed parallel to each other to range from the peripheral wall of the bearing holder to a predetermined position of the bottom wall. That is, bearing holder 21 has holding portion 25 formed to enclose and hold first bearing 18a and a preload portion 26 supported by the bottom wall 25a of holding portion 25 via the pair of slits 25, 25.

As shown in FIGS. 1 to 5, the previously-noted holding portion 25 has a first annular groove 27, which is circumferentially continuously formed in the outer peripheral surface of the upper end of the peripheral wall 25b of the holding portion, and into which O ring 22 is fitted. Additionally, holding portion 25 is formed in a predetermined circumferential position of its upper end face with an axially-inward (upward) protruding, engaged protrusion portion 28. On the other hand, the holding portion is formed on its outer bottom surface with a plurality of axially-outward (downward) protruding, protrusions 29. Furthermore, as shown in FIGS. 2-3, holding portion 25 is formed on its inner peripheral surface with two opposing flat guides 30, which are arranged parallel to each other and spaced apart from each other by a radial distance W1 identical to or slightly less than the outside diameter R1 of first bearing 18a. The groove depth of first annular groove 27 is set and dimensioned to be substantially identical to the cross-sectional dimension of O ring 22.

As shown in FIGS. 1 to 3, the previously-noted preload portion 26 has a spring portion 31 provided to be elastically deformable upward and downward, utilizing a basal-end portion 31a, formed integral with the bottom wall 25a of holding portion 25, as a fulcrum, and a pushing portion 32 extending upward from spring portion 31 almost perpendicularly to the spring portion for preloading or pushing first bearing 18a against the inner opposed surface. The previously-noted spring portion 31 is formed into a tapered shape that its thickness gradually increases radially outward from the basal-end portion 31a. As a whole, the spring portion is formed as a thin-walled section as compared to the bottom wall 25a of holding portion 25. Spring portion 31 is also configured to be slightly up-sloped radially outward from the basal-end portion 31a under an unloaded condition, such that the inside diameter r2 of the inside edged portion of pushing portion 32 is dimensioned to be less than the outside diameter R1 of first bearing 18a.

The previously-noted pushing portion 32 has a thickness substantially identical to the peripheral wall 25b of holding portion 25. The pushing portion has a second annular groove 33, which is formed in the outer circumference of the upper end of the pushing portion, and into which at least part of O ring 22 in the circumferential direction is fitted. Second annular groove 33 is connected with first annular groove 27 through slits 24, 24, such that the second annular groove, together with first annular groove 27, is configured to form a series of annular grooves. Additionally, second annular groove 33 is formed so that the groove depth d1 of the second annular groove is dimensioned to be shallower than the groove depth d2 of first annular groove 27, and that the groove width w1 of the second annular groove is dimensioned to be greater than the groove width w2 of first annular groove 27.

As shown in FIG. 1, adjustment-mechanism housing portion 40 of shaft housing portion 16 is also formed in its upper wall surface with an engage groove 40b, which is cut out in a given position conformable to the engaged protrusion portion 28 of holding portion 25, for restricting the displacement of bearing holder 21 in the direction of rotation of the bearing holder.

As shown in FIGS. 4-5, O ring 22 is set or designed so that its inside diameter R2 is dimensioned to be less than the inside diameter r3 of second annular groove 33 of preload portion 26. When the O ring is retained and fitted onto the outer circumference of bearing holder 21 through first and second annular grooves 27 and 33, by virtue of a shrinking action of the O ring as indicated by the arrows P in the drawings, the O ring acts on preload portion 26 such that the preload portion is pulled inward, thereby assisting the force of resiliency of the preload portion 26 itself. The inside diameter r4 of the inner edged portion of pushing portion 32 under the installed condition of the O ring is dimensioned to be slightly shrunk in comparison with the inside diameter r2 of the inner edged portion of pushing portion 32 under the uninstalled condition of O ring 22.

As shown in FIG. 1, plug member 23 is formed into a hermetically-covered, cylindrical shape. The plug member is press-fitted into the opening end of adjustment-mechanism housing portion 40, such that the upper wall surface of the plug member is forced into contact with each of protrusions 29 of bearing holder 21.

As shown in FIGS. 1 and 10, when assembling or installing bearing holder 21 on the housing of power steering system 1, first of all, first bearing 18a is installed on the lower end of wormshaft 14. Thereafter, snap ring 19 is fitted into annular groove 14c and put in place, such that the tapered sidewall surface of the annular groove and the tapered sidewall surface of the snap ring are fitted to each other. In this manner, first bearing 18a is retained and installed on the lower end of wormshaft 14. This wormshaft 14 is inserted into shaft housing portion 16 from the lower opening end, and installed in such a manner as to be brought into meshed-engagement with worm wheel 15. Thereafter, second bearing 18b is installed on the upper end of wormshaft 14. Bearing holder 21 is inserted into adjustment-mechanism housing portion 40 in such a manner to enclose and fit onto first bearing 18a from the lower opening end, and whereby engaged protrusion portion 28 is fitted into engage groove 40b. After this, plug member 23 is press-fitted into adjustment-mechanism housing portion 40, such that the plug member is retained and installed in the adjustment-mechanism housing portion in a state where the upper wall surface of plug member 23 is forced into contact with the top face of each of protrusions 29 of bearing holder 21. In this manner, assembling of the bearing holder is completed.

As shown in FIGS. 6 and 7, the inside diameter r1 of holding portion 25 of bearing holder 21 is dimensioned to be greater than the outside diameter R1 of first bearing 18a, and the inside diameter r4 of the inner edged portion of pushing portion 32 under the inwardly preloaded condition is dimensioned to be less than the outside diameter R1 of first bearing 18a. Therefore, after bearing holder 21 has been installed in a manner so as to enclose and fit onto first bearing 18a, as described previously, a push force or a pressure (see the arrow F0) from first bearing 18a, which pressure is created due to the dimensional difference between the outside diameter R1 of first bearing 18a and the inside diameter r4 of the inner edged portion of pushing portion 32, acts on preload portion 26, so that preload portion 26 is forced radially outward by first bearing 18a. Thus, the force of resiliency of preload portion 26 itself is produced, and simultaneously the shrinkage force is produced as a result of enlarged deformation of O ring 22 in diameter. By virtue of these forces, first bearing 18a is automatically preloaded or forced toward worm wheel 15 through pushing portion 32.

That is, when preload portion 26 is forced radially outward, downward elastic-deformation of spring portion 31 occurs, following the radially-outward movement of pushing portion 32. Additionally, elastic deformation of O ring 22 occurs such that the diameter of the O ring enlarges. The preload (see the arrow f0) corresponding to the resultant force of the force (see the arrow f1) of resiliency of spring portion 31 and the shrinkage force (see the arrow f2) of O ring 22 acts on first bearing 18a through pushing portion 32, and then transmitted via first bearing 18a to the lower end of wormshaft 14. Additionally, the preload (see the arrow f0), inputted from pushing portion 32 to first bearing 18a, acts on first bearing 18a in a rotational direction that the bearing is rotated about basal-end portion 31a of spring portion 31, serving as a fulcrum, that is, as a force acting in an obliquely upward direction with respect to first bearing 18a. Hence, the lower end of wormshaft 14 is forced into meshed-engagement with worm wheel 15.

Therefore, even when a change in the backlash between toothed portions 14a and 15a occurs due to tooth-flank wears of the toothed portion 14a of wormshaft 14 and the toothed portion 15a of the mating worm wheel 15, the backlash between toothed portions 14a and 15a can be always maintained at zero backlash, since the lower end of wormshaft 14 is permanently forced into meshed-engagement with worm wheel 15.

Bearing holder 21, which provides the above-mentioned backlash-free effect, is arranged coaxially with shaft housing portion 16. The bearing holder is configured to be held by the previously-discussed restriction wall 40a having the inner peripheral surface of a slightly larger curvature than the curvature of the outer peripheral surface of holding portion 25. Therefore, in the case of the present embodiment, it is possible to simultaneously machine restriction wall 40a, together with shaft housing portion 16, by drilling from the bottom of housing 11 (viewing FIG. 12). Accordingly, both the restriction wall 40a and the shaft housing portion 16 can be rapidly easily machined, thus ensuring reduced machining time, and thus it is possible to suppress manufacturing costs of the system from being increased due to the introduction of backlash adjustment mechanism 20.

Furthermore, by simultaneously machining both restriction wall 40a and shaft housing portion 16, it is possible to enhance machining accuracies of the wall surface and the radial position of restriction wall 40a relative to shaft housing portion 16. Hence, it is possible to ensure and enhance the accuracy of relative position between bearing holder 21 and first bearing 18a. As a result of this, an effective preloading action of preload portion 26 can be ensured, and thus the accuracy of meshed-engagement between toothed portion 14a of wormshaft 14 and toothed portion 15a of worm wheel 15 can be more certainly enhanced. As shown in FIG. 6, bearing holder 21 has a clearance space c1 formed or defined between the inner peripheral surface of holding portion 25 and the outer peripheral surface of first bearing 18a, which clearance space corresponds to the difference between the outside diameter R1 of first bearing 18a and the inside diameter r1 of holding portion 25. Thus, it is possible to adjust the previously-noted backlash within a limited range, corresponding to the clearance space c1. Moreover, preload portion 26 is preformed to be deflected or tilted radially inward.

Additionally, the preload portion is elastically deformed inward by the shrinkage force of O ring 22, and thus a clearance space c2 is formed or defined between the outer peripheral surface of the upper end of pushing portion 32 and the wall surface of restriction wall 40a. A clearance space c3 is also formed or defined between the upper end face of pushing portion 32 and the inner bottom face of the stepped portion of adjustment-mechanism housing portion 40, such that elastic-deformation of preload portion 26 can be permitted in a rotational direction that the preload portion is rotated about basal-end portion 31a of spring portion 31 within a range limited by at least the clearance space c1 and the clearance space c2.

For the reasons discussed above, as shown in FIGS. 8-9, even when an expanded deformation of toothed portion 15a of worm wheel 15 occurs due to a temperature rise in speed reduction mechanism 10, or even when a push force or a pressure (see the arrow F) that worm wheel 15 forces wormshaft 14 radially outward by a meshing force between toothed portion 14a of wormshaft 14 and toothed portion 15a of worm wheel 15 is generated, the system of the embodiment enables or permits a radially-outward deflection of preload portion 26 to such a rotation angle that almost all of the outer peripheral surface of pushing portion 32 is brought into abutment with the wall surface of restriction wall 40a and thus clearance space c2 becomes zero. Additionally, it is possible to always maintain the backlash between toothed portions 14a and 15a at zero backlash by the preload. Furthermore, bearing holder 21 is formed of a synthetic resin, and thus it is possible to reduce impact-noise generated when the outer peripheral surface of pushing portion 32 is brought into abutment with the wall surface of restriction wall 40a by the push force (see the arrow F). As shown in FIGS. 3 and 6, the groove depth d1 of second annular groove 33 is dimensioned to be less than the groove depth d2 of first annular groove 27, that is, the cross-sectional dimension of O ring 22. The difference between these groove depths is set to be slightly less than the clearance space c2. In the presence of downward elastic-deformation of preload portion 26, as seen in FIG. 8, with elastic deformation of O ring 22 that the diameter of the O ring enlarges, the cross section of the O ring near second annular groove 33 is deformed into an elliptical shape, and thus the radial cross-sectional dimension of the O ring tends to reduce. Therefore, the previously-discussed groove-depth difference is also set to be slightly less than the groove depth d1 of second annular groove 33.

As a result of this, when preload portion 26 deflects upward or downward with elastic deformation of the preload portion itself, O ring 22 is kept in a non-contact state where the C) ring is out of contact with restriction wall 40a. Thus, there is no slip between the outer peripheral surface of the O ring and the wall surface of restriction wall 40a, even in the presence of enlarged deformation or shrunk deformation of O ring 22. Therefore, it is possible to prevent a hysteresis loss from occurring during elastic deformation of O ring 22.

Furthermore, as shown in FIGS. 6 and 8, the preload portion formed integral with bearing holder 21 can be elastically deformed in a rotational direction that the preload portion is rotated about basal-end portion 31a of spring portion 31, serving as a fulcrum, but the groove width w1 of second annular groove 33 is dimensioned to be greater than the groove width w2 of first annular groove 27. Therefore, it is possible to ensure a necessary space, required for a displacement of O ring 22 within second annular groove 33 due to preload portion 26 deflected in the rotational direction. Accordingly, during elastic deformation of preload portion 26, it is possible to suppress shearing of O ring 22, thus preventing a deterioration in O ring 22.

Regarding backlash-adjustment between wormshaft 14 and worm wheel 15 by means of backlash adjustment mechanism 20, as previously described, when only the preload acts on wormshaft 14 and thus the outer peripheral surface of pushing portion 32 is still out of abutment with the wall surface of restriction wall 40a, the backlash-adjustment is made by the spring load of spring portion 31 and the shrinkage force of O ring 22. After the outer peripheral surface of pushing portion 32 has been brought into abutment with the wall surface of restriction wall 40a due to an excessive load input from worm wheel 15 to wormshaft 14, the backlash-adjustment is made by the reaction force (the elastic force) produced by compressive deformation of pushing portion 32 in addition to both the spring load of spring portion 31 and the shrinkage force of O ring 22. As appreciated, the preload portion 26 of backlash adjustment mechanism 20 has a non-linear load-deflection characteristic that a plurality of spring-stiffness characteristic values are combined with each other.

Details of the load-deflection characteristic of preload portion 26 are hereunder described in reference to FIG. 11. In the characteristic diagram shown in FIG. 11, assume that the zero deflection point, obtained under a specific state where there is no generation of the meshing force between wormshaft 14 and worm wheel 15, is defined as an origin "O", and the abutment point, obtained when the outer peripheral surface of pushing portion 32 has been brought into abutment with the wall surface of restriction wall 40a, is defined as a point "M".

As previously discussed, preload portion 26 is forced radially outward, under a condition where bearing holder 21 is mounted in such a manner as to enclose and fit onto first bearing 18a. Thus, at the origin "O", a predetermined or preset load N acts on preload portion 26. Under these conditions, when a meshing force is created between wormshaft 14 and worm wheel 15 due to steering action, preload portion 26 is forced radially outward against a comparatively weak elastic force, produced by the force of resiliency of spring portion 31 and the shrinkage force of O ring 22, until the outer peripheral surface of pushing portion 32 is brought into abutment with the wall surface of restriction wall 40a within a normal steering-assist area, that is, within an area defined between the origin "O" and the point "M". Therefore, within such an area, the shown load-deflection characteristic exhibits a small spring-stiffness characteristic having a moderate gradient. After the outer peripheral surface of pushing portion 32 has been brought into abutment with the wall surface of restriction wall 40a, that is, within an area corresponding to the right-hand side of the point "M", pushing portion 32 is forced against the inner wall of adjustment-mechanism housing portion 40 through first bearing 18a, and thus compressive deformation of pushing portion 32 itself in the radial direction (i.e., in thickness) occurs. In particular, in an abutment-input area in which the steering input element has been brought into abutted-engagement with its lock end under the steering-assist state, a strong reaction force (an excessively large input load), transmitted from worm wheel 15, acts on wormshaft 14. Within such a large input area, preload portion 26 is forced radially outward against a comparatively strong reaction force (elastic force), produced by the compressive deformation of pushing portion 32. Therefore, within the large input area, the shown load-deflection characteristic exhibits a large spring-stiffness characteristic having a steep gradient. As set forth above, regarding backlash adjustment mechanism 20, the load-deflection characteristic of preload portion 26 is designed to provide a plurality of spring-stiffness characteristic values differing from each other. Even at a normal steering mode during flat-road driving, or even in the presence of action of an excessively large input load from the road surface to the steering system, it is possible to provide the deflection characteristic of preload portion 26, suited for each of the steering situations. Thus, it is possible to constantly apply an appropriate preload to wormshaft 14 in the direction of meshed-engagement with worm wheel 15. As a result, it is possible to enhance the accuracy of meshed-engagement between toothed portion 14a of wormshaft 14 and toothed portion 15a of worm wheel 15.

Therefore, according to the embodiment, the holding portion 25 provided to hold first bearing 18a and the preload portion 26 provided to preload first bearing 18a are integrally formed each other as bearing holder 21, and whereby it is possible to enhance the accuracy of relative position between preload portion 26 and first bearing 18a. This enables certain, stable preloading of wormshaft 14 in the direction of meshed-engagement with worm wheel 15. As a result of this, it is possible to enhance the accuracy of meshed-engagement between toothed portion 14a of wormshaft 14 and toothed portion 15a of worm wheel 15.

When installing bearing holder 21, which can provide the previously-discussed operation and effects, the bearing holder 21 is formed coaxially with shaft housing portion 16, and configured to be retained by a wall surface of restriction wall 40a having a substantially same curvature as holding portion 25. Therefore, it is possible to simultaneously machine the wall surface of restriction wall 40a, together with shaft housing portion 16, by drilling. Accordingly, both the restriction wall and the shaft housing portion can be rapidly easily machined, thus ensuring reduced machining time, and thus it is possible to suppress manufacturing costs of the system from being increased due to the introduction of backlash adjustment mechanism 20. Additionally, by virtue of the previously-noted simultaneously machining, it is possible to enhance the machining accuracy of restriction wall 40a relative to shaft housing portion 16, thus ensuring a high-precision relative-position relationship between bearing holder 21 and first bearing 18a. As a result of this, an effective preloading action of preload portion 26 can be ensured, and thus the accuracy of meshed-engagement between toothed portion 14a of wormshaft 14 and toothed portion 15a of worm wheel 15 can be more certainly enhanced.

Furthermore, O ring 22 is installed on bearing holder 21, for assisting preload portion 26. Hence, it is possible to increase the preload of preload portion 26, thus suppressing the resiliency of the preload portion from deteriorating due to repeated elastic-deformations of spring portion 31. This enhances the durability of preload portion 26, thus insuring a more stable preload acting on wormshaft 14 in the direction of meshed-engagement.

Moreover, by the addition of O ring 22, it is possible to preload wormshaft 14 by means of two preloading means having spring stiffnesses differing from each other, thus enhancing the degree of freedom of adjustment of the preload of bearing holder 21. Accordingly, it is possible to set the preload to a more appropriate magnitude.

Additionally, spring portion 31 is formed into a tapered shape that its thickness gradually increases radially outward, such that only the rigidity of basal-end portion 31a is reduced. Hence, it is possible to ensure the total rigidity of preload portion 26, while ensuring a good elasticity of spring portion 31.

Also, holding portion 25 is formed on its inner peripheral surface with two opposing guides 30, spaced apart from each other by the radial distance W1 identical to or slightly less than the outside diameter R1 of first bearing 18a. Therefore, when first bearing 18a is forced by means of preload portion 26, only the radial displacement of first bearing 18a toward worm wheel 15 is permitted by restriction of guides 30. Thus, it is possible to certainly force the lower end of wormshaft 14 in the direction of meshed-engagement with worm wheel 15.

Furthermore, in order to disable rotation of bearing holder 21, engaged protrusion portion 28, formed integral with holding portion 25, is engaged with engage groove 40b, formed in adjustment-mechanism housing portion 40. Accordingly, it is possible to certainly prevent undesirable rotary motion of bearing holder 21, which may occur due to vibrations, and thus it is possible to more certainly preload the lower end of wormshaft 14 in the direction of meshed-engagement with worm wheel 15.

Additionally, holding portion 25 is formed on its outer bottom surface with a plurality of protrusions 29, and plug member 23 is forced into contact with each of protrusions 29. Hence, axial rattling motion of bearing holder 21 can be certainly prevented. Accordingly, it is possible to more certainly preload the lower end of wormshaft 14 in the direction of meshed-engagement with worm wheel 15.

Also, bearing holder 21 is formed of a synthetic resin, and, therefore, as a matter of course, it is possible to easily form the bearing holder. In particular, even when an excessively large input load, transmitted from the side of worm wheel 15, acts on wormshaft 14, it is possible to prevent impact-noise caused by abutment of preload portion 26 with restriction wall 40a due to the input load. Also, preload portion 26 is configured to be supported by the bottom wall of holding portion 25 via slits 24, 24. Thus, it is possible to freely set a radial displacement of preload portion 26 by varying only the depth-of-cut of each of slits 24, 24. Additionally, it is possible to adjust the stiffness of preload portion 26 relative to holding portion 25, that is, the preload created by preload portion 26, by varying only the interval between slits 24, 24. This contributes to the increased design flexibility of bearing holder 21. Furthermore, the direction of the cut-out of each of slits 24, 24 is designed to be identical to the direction of deflection of preload portion 26, thereby easily assuring the directionality of preload portion 26 when deflected.

As previously discussed, O ring 22 acts or serves to assist the force of resiliency of preload portion 26. Thus, even in the case of bearing holder 21 not employing O ring 22, it is possible to provide almost the same operation and effects as the first embodiment.

FIGS. 14-15 show the system of the second embodiment, made according to the present invention, which modifies preloading means, constructing preload portion 26. Preload portion 26 is configured such that, under an unloaded condition, its pushing portion 32 is arranged substantially parallel to the peripheral wall 25b of holding portion 25, and that the inside diameter r2 of the inside edged portion of pushing portion 32 is dimensioned to be substantially identical to the inside diameter r1 of holding portion 25, thus forcing preload portion 26 radially inward by only the shrinkage force of O ring 22. That is, by fitting O ring 22 into second annular groove 33, whose depth is formed to be shallower than that of first annular groove 27, as indicated by the two-dotted line in the drawings, by virtue of a shrinking action of O ring 22, preload portion 26 is kept in a state where the preload portion is pulled inward.

Therefore, the second embodiment can provide the same operation and effects as the first embodiment. Additionally, it is possible to finely set the preload by varying the cross-sectional dimension and/or the inside diameter of O ring 22, thus producing a more appropriate magnitude of preload. Hence, it is possible to more certainly enhance the accuracy of meshed-engagement between toothed portion 14a of worm-shaft 14 and toothed portion 15a of worm wheel 15 FIGS. 16-17 show the system of the third embodiment, made according to the present invention, in which the shape of spring portion 31 is modified from the second embodiment. As a whole, spring portion 31 is formed as a thin-walled section, as compared to the bottom wall 25a of holding portion 25, and spring portion 31 is formed into a flat shape. Only the basal-end portion 31a is formed as a further thin-walled section.

In the third embodiment, it is possible to reduce only the rigidity of basal-end portion 31a. Thus, the third embodiment can provide the same operation and effects as the second embodiment.

FIGS. 18-19 show the system of the fourth embodiment, made according to the present invention, in which the shape of spring portion 31 is also modified from the second embodiment. As a whole, spring portion 31 is formed as a thin-walled section, as compared to the bottom wall 25a of holding portion 25, and spring portion 31 is formed into a flat shape. Only the radial width of basal-end portion 31a is narrowed.

In the fourth embodiment, in a similar manner to the third embodiment, it is possible to reduce only the rigidity of basal-end portion 31a. Thus, the fourth embodiment can provide the same operation and effects as the second embodiment. In the drawings, the narrowed-width portion is formed and cut out outward from the position slightly spaced apart from the root of basal-end portion 31a. Depending on the degree of the designated rigidity of basal-end portion 31a, the narrowed-width portion may be formed and cut out from the root of basal-end portion 31a.

FIGS. 20-21 show the system of the fifth embodiment, made according to the present invention, in which the location of engaged protrusion portion 28 is modified from the second embodiment. In the fifth embodiment, on the one hand, engaged protrusion portion 28 is protruded from and formed in a predetermined circumferential position of the outside edged portion of the lower end of the outer peripheral surface of holding portion 25. On the other hand, engage groove 40b is eliminated, but, in lieu thereof, an engage groove (not shown) is formed in the wall surface of restriction wall 40a and cut out in a given position conformable to the engaged protrusion portion 28, protruded from the outer peripheral surface of holding portion 25. Hence, it is possible to prevent rotary motion of bearing holder 21. Thus, the fifth embodiment can provide the same operation and effects as the second embodiment.

FIGS. 22-23 show the system of the sixth embodiment, made according to the present invention, in which the locking structure of bearing holder 21 is modified from the second embodiment. Engaged protrusion portion 28 of holding portion 25 and engage groove 40b of adjustment-mechanism housing portion 40 are eliminated. In lieu thereof, a plurality of radially-outward protruding protrusions 34, are formed to axially extend within given circumferential ranges X of peripheral wall 25b of holding portion 25, within which guides 30 are formed.

Hereby, bearing holder 21 can be press-fitted into adjustment-mechanism housing portion 40, and thus protrusions 34 are forced into contact with restriction wall 40a so as to prevent rotary motion of the bearing holder. Thus, the sixth embodiment can provide the same operation and effects; as the second embodiment.

FIG. 24 shows the system of the seventh embodiment, made according to the present invention. The fundamental system configuration of the seventh embodiment is similar to the second embodiment. The seventh embodiment differs from the second embodiment, in that O ring 22, first annular groove 27, and second annular groove 33 are eliminated. In lieu thereof, spring portion 31 has a recessed groove 35 formed in its outside end of the outer bottom surface in the substantially central position in the width direction of the spring portion. A coil spring 36, which serves as a second preload member, is disposed between recessed groove 35 and the upper wall surface of plug member 23, in a state where the spring portion is preloaded or spring-loaded by a preset elastic force created by the coil spring.

Hence, spring portion 31 tends to be elastically preloaded or deflected upward by the spring load of coil spring 36, thus assisting the force of resiliency of preload portion 26. Therefore, preload portion 26 can draw the same rotary locus about basal-end portion 31a, serving as the rotation center, as the second embodiment. Thus, the seventh embodiment can provide the same operation and effects as the second embodiment.

FIGS. 25 to 27 show the system of the eighth embodiment, made according to the present invention. The fundamental system configuration of the eighth embodiment is similar to the first embodiment. The eighth embodiment differs from the first embodiment, in that, mainly, the cut-out direction of each of slits 24, 24 of bearing holder 21 is modified from the first embodiment.

That is, as shown in FIG. 25, slits 24, 24 of bearing holder 21 are cut out and formed into a shape of a character of "/\", such that the circumferential width Wr of preload portion 26 gradually reduces toward the center "Q" of bearing holder 21. Concretely, slits 24, 24 are cut out based on a cutting angle that the intersection point "Q" of two groove centerlines, each interconnecting the outside end (beginning-of-slit) and the inside end (end-of-slit), is located radially outside of the inner peripheral surface of peripheral wall 25b of holding portion 25.

Additionally, in the eighth embodiment, plug member 23 is eliminated. In lieu thereof, as shown in FIG. 27, the lower end of adjustment-mechanism housing portion 40 is closed by a bottom wall 40c, which is formed integral with its peripheral wall (the previously-discussed restriction wall 40a). Furthermore, adjustment-mechanism housing portion 40 is formed to have almost the same bore as shaft housing portion 16, and therefore the stepped portion between shaft housing portion 16 and adjustment-mechanism housing portion 40 is eliminated. Hence, the upper wall portion of adjustment-mechanism housing portion 40 is also eliminated.

Regarding bearing holder 21, as shown in FIGS. 25 to 27, owing to the elimination of the upper wall portion of adjustment-mechanism housing portion 40, the location of engaged protrusion portion 28 of holding portion 25 is modified. That is, the engaged protrusion portion is formed on the lower end face, i.e., on the outer bottom surface of bottom wall 25a of holding portion 25, in such a manner as to protrude axially outward (downward). Herewith, adjustment-mechanism housing portion 40 is formed in its bottom wall 40c with engage groove 40b, which is engaged with the engaged protrusion portion 28 and cut out in a given position conformable to the engaged protrusion portion 28.

Furthermore, bearing holder 21 is formed with an inwardly-protruding stepped portion 37, which is arranged within a predetermined range of the lower end of the inner circumference of holding portion 25 and has the inside diameter r5 sufficiently smaller than the outside diameter R1 of first bearing 18a. That is, stepped portion 37 is formed within a substantially semi-circular range extending from one of guides 30 to the other guide 30, and formed into a substantially U-shape in lateral cross-section in such a manner as to circumferentially continuously extend along the inner peripheral surface of holding portion 25. The upper end face of the stepped portion is formed as a substantially horizontal surface. First bearing 18a is supported by the stepped portion 37. By virtue of the stepped portion, first bearing 18a is forced toward restriction portion 14b of wormshaft 14, so as to restrict an axially-outward movement (a downward movement) of first bearing 18a. This eliminates the necessity of snap ring 19 of the first embodiment. Therefore, according to the eighth embodiment, preload portion 26 is formed such that its circumferential width Wr gradually increases radially outward. It is possible to increase the pressure-receiving area of pushing portion 32 needed to receive an input load transmitted from the side of worm wheel 15 through first bearing 18a, while ensuring an appropriate rigidity of basal-end portion 31a of spring portion 31, in other words, an appropriate preload of preload portion 26.

Hereby, even when an excessively large input load from worm wheel 15 acts on wormshaft 14, it is possible to adequately reduce a bearing pressure acting on pushing portion 32 through first bearing 18a and arising from the input load. As a result, it is possible to enhance the pressure tightness of pushing portion 32. Therefore, even when pushing portion 32 is jammed between first bearing 18a and restriction wall 40a, there is no risk of buckling or damage to pushing portion 32.

Additionally, it is possible to more certainly enhance the ability of pushing portion 32 to hold first bearing 18a by circumferentially enlarging the pressure-receiving area of pushing portion 32, thus enabling first bearing 18a to be certainly held at the central side of bearing holder 21. As a result of this, it is possible to enhance the accuracy of meshed-engagement between toothed portion 14a of wormshaft 14 and toothed portion 15a of worm wheel 15.

Regarding the cutting angle of each of slits 24, 24, it is more preferable to set the cutting angle to a cutting angle that the angle α between the line segment X connecting the center "O" of holding portion 25 and the circumferential midpoint of pushing portion 32 and the line segment Y connecting the center "O" of holding portion 25 and the groove center of the beginning-of-slit of each of slits 24, 24 is an approximately 45°. In the case of setting of the cutting angle to such a cutting angle, the bearing pressure acting on pushing portion 32 and the preload applied to wormshaft 14 by preload portion 26 are greatly balanced to each other. In this case, it is possible to reconcile both the enhanced pressure tightness of pushing portion 32 and the enhanced accuracy of meshed-engagement between wormshaft 14 and worm wheel 15.

Furthermore, the lower end of adjustment-mechanism housing portion 40 is formed as the bottom wall 40c, which is formed integral with housing 11, and hence plug member 23 is eliminated. Additionally, regarding bearing holder 21, holding portion 25 has stepped portion 37 integrally formed on the lower end of its inner periphery, and hence snap ring 19 is eliminated. Therefore, it is possible to reduce the number of parts of backlash adjustment mechanism 20, thus enhancing the assembling efficiency of the system. As a result of this, it is possible to suppress manufacturing costs of the system from being increased due to the introduction of backlash adjustment mechanism 20.

FIGS. 28 to 30 show the system of the ninth embodiment, made according to the present invention. The fundamental system configuration of the ninth embodiment is similar to the first embodiment. The ninth embodiment differs from the first embodiment, in that the shape of bearing holder 21 is modified from each of the previously-discussed embodiments. That is, the bearing holder is not formed into a cylindrical shape, but formed into a substantially circular-arc shape. The preload generating structure is modified based on such a shape change of the bearing holder. For the purpose of simplification of the disclosure, the same reference signs used to designate members and parts shown in each of the previously-discussed embodiments will be applied to the corresponding members and parts shown in the ninth embodiment.

That is, as shown in FIGS. 28-29, bearing holder 21 is formed of a synthetic resin, in the same manner as each of the previously-discussed embodiments. The bearing holder is mainly constructed by holding portion 25, which serves as a main body of the bearing holder and is formed into a substantially circular-arc shape in lateral cross-section. Holding portion 25 has the inside diameter r1 slightly less than the outside diameter R1 of first bearing 18a. The holding portion is formed with a thin-walled portion 38, which is formed within a predetermined circumferential range at a substantially intermediate position of holding portion 25, and whose radial thickness is dimensioned to be slightly thin-walled. Both ends of a radially-deformable preload portion 26 are integrally connected to the respective circumferential ends of the inner periphery of thin-walled portion 38, in such a manner as to bypass thin-walled portion 38. Thus, an internal space 39 is defined between preload portion 26 and thin-walled portion 38, in such a manner as to be formed into a substantially elliptical shape in lateral cross-section. With the previously-noted bearing holder 21, as shown in FIG. 30, the bearing holder is housed and retained in adjustment-mechanism housing portion 40 such that the opening of holding portion 25 is oriented toward the side of worm wheel 15.

As shown in FIGS. 28 to 30, preload portion 26 is configured to enable first bearing 18a to be preloaded radially toward the opening of holding portion 25 by the force of resiliency of the preload portion itself. Under an unloaded condition (under a load-free condition), the radial distance L from the inner surface of the preload portion to the center "O" of holding portion 25 is dimensioned to be less than the outside diameter R1 of first bearing 18a in such a manner as to define the internal space 39 between the preload portion and thin-walled portion 38. When the greatest radially-outward elastic deformation of the preload portion occurs, the previously-noted radial distance L is also set to be substantially identical to the outside diameter R1 of first bearing 18a, such that the outer surface of the preload portion is brought into abutment with the inner peripheral surface of thin-walled portion 38 and then the preload portion and the thin-walled portion become abutted closely to each other.

Furthermore, holding portion 25 is formed on its inner peripheral surface of the circumferential both ends with two opposing flat guides 30, which are arranged parallel to each other and spaced apart from each other by the radial distance (the radial width) W1 identical to or slightly less than the outside diameter R1 of first bearing 18a. Therefore, when first bearing 18a is forced by means of preload portion 26, only the radial displacement of first bearing 18a toward worm wheel 15 is permitted by restriction of guides 30. Thus, it is possible to certainly force the lower end of wormshaft 14 in the direction of meshed-engagement with worm wheel 15.

Moreover, holding portion 25 is formed on its inner peripheral surface of the circumferential both ends with two opposing, radially-inward protruding stepped portions 37, 37, which is spaced apart from each other by a radial distance (or a radial interval) W2 sufficiently smaller than the outside diameter R1 of first bearing 18a, and each of which upper end faces is formed as a substantially horizontal surface. These stepped portions are opposed to each other and arranged parallel to each other along the respective guides 30. First bearing 18a is supported by the stepped portions 37. By virtue of the stepped portions, first bearing 18a is forced toward restriction portion 14b of wormshaft 14, so as to restrict an axially-outward movement (a downward movement) of first bearing 18a. This eliminates the necessity of snap ring 19.

Additionally, holding portion 25 is formed in a predetermined circumferential position of its upper end face with an axially-inward (upward) protruding, engaged protrusion portion 28, which is engaged with engage groove 40b of adjustment-mechanism housing portion 40, thereby restricting the displacement of bearing holder 21 in the direction of rotation of the bearing holder.

As shown in FIG. 30, under a condition where bearing holder 21, constructed as discussed previously, is inserted into adjustment-mechanism housing portion 40 in such a manner as to enclose and fit onto first bearing 18a, fitted to the lower end of wormshaft 14, the inside diameter r1 of holding portion 25 is dimensioned to be greater than the outside diameter R1 of first bearing 18a. Additionally, under an unloaded condition of preload portion 26, its radial distance L is dimensioned to be less than the outside diameter R1 of first bearing 18a. Thus, a push force or a pressure (see the arrow F0) from first bearing 18a, which pressure is created due to the dimensional difference between the outside diameter R1 of first bearing 18a and the radial distance L, defined by preload portion 26, acts on preload portion 26, so that preload portion 26 is forced radially outward by first bearing 18a. Thus, the force (see the arrow f1) of resiliency of preload portion 26 itself is generated. By virtue of the force of resiliency, first bearing 18a is automatically preloaded or forced toward worm wheel 15.

As set forth above, the force of resiliency of preload portion 26 is transmitted through first bearing 18a to the lower end of wormshaft 14, and therefore the lower end of wormshaft 14 is permanently preloaded in the direction of meshed-engagement with worm wheel 15, in the same manner as each of the previously-discussed embodiments. Accordingly, the backlash between toothed portions 14a and 15a of the wormshaft and worm wheel can be always maintained at zero backlash.

Therefore, according to the ninth embodiment, bearing holder 21 has the minimized configuration needed to solve the technical task of the present application. That is, it is possible to inexpensively produce bearing holder 21, and thus it is possible to suppress manufacturing costs of the system from being increased due to the introduction of bearing holder 21.

Additionally, the bearing holder 21 of the ninth embodiment differs from that of each of the previously-discussed embodiments, in that there is no need that a separate preloading member must be provided. Therefore, it is possible to reduce the number of component parts, constructing backlash adjustment mechanism 20, thus enhancing the assembling efficiency of the system. As a result of this, it is possible to more certainly suppress manufacturing costs of the system from being increased.

In the case of the aforementioned bearing holder 21, when an excessively large input load, transmitted from worm wheel 15, acts on wormshaft 14, preload portion 26 is brought into abutment with the thin-walled portion 38 of holding portion 25. Thin-walled portion 38 and preload portion 26 are both formed of synthetic resins and formed integral with each other, and therefore it is possible to more certainly suppress impact-noise caused by abutment between the thin-walled portion and the preload portion. Additionally, even when the comparatively thin-walled preload portion 26 is jammed between first bearing 18a and thin-walled portion 38, there is no risk of buckling or damage to preload portion 26, since first bearing 18a, i.e., one of the two members sandwiching the preload portion therebetween, is constructed by metal materials but thin-walled portion 38, i.e., the other of the two members, is formed of a synthetic resin.

Furthermore, preload portion 26 is configured to be abutted closely to thin-walled portion 38, when an excessively large input load is applied through first bearing 18a to bearing holder 21 so that both of the preload portion and the thin-walled portion are unified. Thus, it is possible to certainly ensure an appropriate rigidity of preload portion 26, enough to withstand the input load. This contributes to the enhanced durability of bearing holder 21.

Hereinafter explained is the other technical concept (technical features) carried out by the previously-described embodiments, except the inventive concept as defined by claims.

(1) A power steering system as set forth in claim 2, characterized in that the previously-described holding portion has a bottom wall and a peripheral wall formed to extend upward from a circumference of the bottom wall for retaining an outer peripheral surface of the bearing, and the preload portion is supported by the bottom wall of the holding portion via a pair of slits, which slits are formed by cutting out the bottom wall and the peripheral wall from the outer-circumference side, and has a spring portion formed continuously with the bottom wall and thin-walled than the bottom wall and a pushing portion extending upward from the outermost end of the spring portion and provided for holding a part of the outer peripheral surface of the bearing, and the bearing is forced in the direction of meshed-engagement of the wormshaft with the worm wheel through the pushing portion by the force of resiliency of the spring portion whose basal-end portion serves as a fulcrum.

(2) A power steering system as set forth in claim 2, characterized in that the previously-described holding portion has a bottom wall and a peripheral wall formed to extend upward from a circumference of the bottom wall for retaining an outer peripheral surface of the bearing, and the preload portion is supported by the bottom wall of the holding portion via a pair of slits, which slits are formed by cutting out the bottom wall and the peripheral wall from the outer-circumference side, and has a spring portion formed continuously with the bottom wall and thin-walled than the bottom wall and a pushing portion extending upward from the outermost end of the spring portion and provided for holding a part of the outer peripheral surface of the bearing, and the bearing is forced in the direction of meshed-engagement of the wormshaft with the worm wheel through the pushing portion by virtue of inward elastic-deformation of the preload portion about the basal-end portion of the spring portion, which basal-end portion serves as a fulcrum, created by the preload of the preload member.

(3) A power steering system as set forth in claims (1) or (2), characterized in that the previously-described slit is formed along the direction of deflection of the preload portion.

According to the above-mentioned invention, it is possible to easily assuring the directionality of the preload portion, when deflected.

(4) A power steering system as set forth in claims (1) or (2), characterized in that the rigidity of the basal-end portion of the previously-described spring portion is set to be less than that of the outside end of the spring portion.

According to the above-mentioned invention, only the rigidity of the basal-end portion of the spring portion is reduced, and hence it is possible to ensure the total rigidity of the preload portion, while ensuring a good elasticity of the spring portion.

(5) A power steering system as set forth in claim (4), characterized in that the spring portion is formed into a tapered shape that its thickness gradually increases outward.

(6) A power steering system as set forth in claim (4), characterized in that the spring portion is formed into a flat shape having an approximately constant thickness, and only the thickness of the basal-end portion is thin-walled than the other portion of the spring portion.

(7) A power steering system as set forth in claim (4) characterized in that the width of the basal-end portion of the spring portion is dimensioned to be less than that of the other portion of the spring portion.

(8) A power steering system as set forth in claim (2) characterized in that the holding portion has a first annular groove formed in the outer peripheral surface of the peripheral wall of the holding portion along the circumferential direction, and the pushing portion has a second annular groove formed in the outer peripheral surface of the pushing portion and formed continuously with the first annular groove via the slits and having a groove depth slightly shallower than the first annular groove, and the preload member is formed into a substantially annular shape and fitted into both the first annular groove and the second annular groove.

(9) A power steering system as set forth in claim (8) characterized in that a groove width of the second annular groove is dimensioned to be greater than that of the first annular groove.

According to the above-mentioned invention, the preload portion is configured to deflect in such a manner as to draw a rotary locus about the basal-end portion, serving as a fulcrum. By virtue of the comparatively large groove width of the second annular groove, it is possible to ensure a necessary space, required for a displacement (a sliding motion) of the preload member. Even when the preload portion is deflecting, it is possible to suppress shearing of the preload member, i.e., the first preload member.

(10) A power steering system as set forth in claim (8), characterized in that the preload member comprises an O ring, such that a preload is applied to the preload portion by a shrinking action of the O ring in the radial direction of the O ring.

(11) A power steering system as set forth in claim (8), characterized in that the preload member comprises an annular coil spring in which a beginning-of-spring and an end-of-spring are connected to each other to form an annular shape, such that a preload is applied to the preload portion by a shrinking action of the annular coil spring in its radial direction.

(12) A power steering system as set forth in claim (8), characterized in that the preload member comprises a substantially annular leaf spring, such that a preload is applied to the preload portion by a shrinking action of the annular leaf spring in its radial direction.

(13) A power steering system as set forth in claim (8), characterized in that the preload member comprises a coil spring, such that a preload is applied to the preload portion by a shrinking action of the coil spring in its radial direction.

(14) A power steering system as set forth in claim (10), characterized in that the groove depth of the first annular groove is set to a depth that the O ring is kept out of contact with the inner peripheral wall of the housing, when the preload portion deflects.

According to the above-mentioned invention, there is no occurrence of slip between the outer peripheral surface of the O ring and the inner peripheral surface of the housing. Thus, it is possible to prevent a hysteresis loss from occurring during elastic deformation of the O ring.

(15) A power steering system as set forth in claim (10), characterized in that the groove depth of the first annular groove is set to a depth that the O ring is kept into elastic-contact with the inner peripheral wall of the housing, when the preload portion deflects.

According to the above-mentioned invention, when the preload portion deflects, the O ring is brought into elastic-contact with the inner peripheral surface of the housing. Thus, even in the presence of input of vibrations transmitted to the system, or in the presence of a large input load applied to the wormshaft, it is possible to prevent noise from being generated due to impact between the bearing and the preload portion and due to impact between the preload portion and the housing.

(16) A power steering system as set forth in claim (2), characterized in that the spring portion has a recessed groove formed in its outside end of the outer bottom surface, and the preload member, which applies an axial preload, is disposed in the recessed groove, and a plug member is provided for closing one opening end of the housing and for restricting an axial movement of the bearing holder, and the preload member is disposed between the inner bottom surface of the recessed groove and one end face of the plug member under preload.

(17) A power steering system, characterized in that the spring portion has a recessed groove formed in the outside end of the outer bottom surface, and a second preload member, which applies an axial preload, is disposed in the recessed groove, and a plug member is provided for closing one opening end of the housing and for restricting an axial movement of the bearing holder, and the second preload member is disposed between the inner bottom surface of the recessed groove and one end face of the plug member under preload.

According to the above-mentioned invention, an inward deflection of the preload portion is assisted by the preload of the second preload member. Thus, it is possible to suppress the influence of changes in the spring characteristic of the spring portion of the preload portion, acting on the bearing, to a minimum, even when a hysteresis loss occurs during elastic deformation of the O ring. Thus, it is possible to reconcile the suitable cushioning effect for impact between the outer peripheral surface of the pushing portion and the inner peripheral surface of the housing and the reliable application of the preload to the bearing.

(18) A power steering system, characterized in that the preload member comprises a coil spring, such that a preload is applied to the spring portion by an axial spring force of the coil spring.

(19) A power steering system as set forth in claim (16), characterized in that the preload member comprises a leaf spring, such that a preload is applied to the spring portion by an upward/downward spring force of the leaf spring.

(20) A power steering system, characterized in that the preload member comprises a substantially column-shaped rubber member, such that a preload is applied to the spring portion by an axial elastic force of the rubber member.

(21) A power steering system, characterized in that a plug member is provided for closing one opening end of the housing and for restricting an axial movement of the bearing holder, and a plurality of protrusions are formed on the outer bottom surface of the bottom wall of the holding portion or on its opposing end face of the plug member, and the plug member is arranged to be forced into contact with the outer bottom surface of the bottom wall of the holding portion through the protrusions.

According to the above-mentioned invention, the bearing holder is forced into contact with the plug member through the protrusions. Thus, it is possible to certainly prevent axial rattling motion of the holding portion of the bearing holder.

(22) A power steering system, characterized in that each of the protrusions is formed on the outer bottom surface of the bottom wall of the holding portion, and the plug member is arranged to be forced into contact with each of the protrusions.

(23) A power steering system, characterized in that the holding portion has a protrusion portion formed on its outer surface.

According to the above-mentioned invention, it is possible to prevent undesirable rotary motion of the bearing holder by the provision of the protrusion portion formed on the outer surface of the holding portion. Thus, it is possible to certainly preload the bearing in the direction that the wormshaft and the worm wheel are brought into meshed-engagement with each other, by means of the preload portion.

(24) A power steering system, characterized in that the protrusion portion comprises a plurality of protrusion portions formed on the outer peripheral surface of the holding portion within a given range of the outer peripheral surface.

(25) A power steering system, characterized in that the housing has a plurality of engage grooves, formed in the inner peripheral surface of the housing in given positions conformable to the respective protrusions in such a manner as to engage with the respective protrusions.

(26) A power steering system, characterized in that the protrusion portion is formed to protrude from the upper end face of the holding portion, and an engage groove, with which the protrusion portion is engaged, is formed in the inner bottom surface of the opening end of the housing.

(27) A power steering system, characterized in that the protrusion portion is formed to protrude from the outer peripheral surface of the holding portion, and an engage groove, with which the protrusion portion is engaged, is formed in the inner peripheral surface of the housing.

(28) A power steering system, characterized in that the bearing is retained at one end of the wormshaft by a retaining means.

(29) A power steering system, characterized in that the retaining means comprises a snap ring.

(30) A power steering system, characterized in that one sidewall surface of the snap ring is formed as a tapered sidewall surface.

(31) A power steering system, characterized in that the snap ring is axially curved and formed into an arc shape.

(32) A power steering system, characterized in that, as the retaining means, the bearing is press-fitted into the one end of the wormshaft.

(33) A power steering system, characterized in that the retaining means comprises a bolt.

(34) A power steering system, characterized in that the retaining means comprises a nut.

It will be understood that the invention is not limited to the particular embodiments shown and described herein, but that various changes and modifications may be made. For instance, the shape and size of the previously-described bearing holder 21 may vary depending on the specification and size of automotive vehicle.

In particular, the previously-discussed O ring 22 represents the first preload member recited in the previously-noted claims. Instead of using the O ring 22, the following means can be used or adopted. As the first example, the beginning-of-spring and the end-of-spring of a comparatively elongated coil spring are connected to each other to form an annular shape, and then the annular coil spring is fitted into both the first annular groove 27 and the second annular groove 33, such that a preload is applied to the pushing portion 32 by a shrinking action of the annular coil spring in its radial direction. As the second example, a substantially annular leaf spring, such as a snap ring, is fitted into both the first annular groove 27 and the second annular groove 33, such that a preload is applied to the pushing portion 32 by a shrinking action of the annular leaf spring in its radial direction. As the third example, a coil spring is fitted into both the first annular groove 27 and the second annular groove 33, such that a preload is applied to the pushing portion 32 by a shrinking action of the coil spring in its radial direction. The modifications as previously discussed can provide the same operation and effects as the first embodiment.

Also, the coil spring represents the second preload member recited in the previously-noted claims. Instead of using the coil spring, the following means can be used or adopted. For instance, a generally-known leaf spring or a substantially column-shaped rubber material may be used. Such a modification can also provide the same operation and effects as the seventh embodiment.

Regarding a structure that wormshaft 14 and first bearing 18a are connected to each other, a part of the previously-discussed snap ring 19 may be curved and formed into a substantially arc shape. The curved portion acts to force first bearing 18a toward the previously-described restriction portion 14b, so as to retain the first bearing in place. Furthermore, as the other example, first bearing 18a may be press-fitted onto the lower end of wormshaft 14. In lieu thereof, first bearing 18a may be forced toward restriction portion 14b by means of a bolt and a nut.

Each of the previously-discussed modifications may be freely combined with each of the embodiments shown and described herein. Such a free or arbitrary combination can provide the same operation and effects as each of the embodiments shown and described herein.

In the shown embodiments, restriction wall 40a is formed into a circular shape in lateral cross-section. However, it will be understood that the restriction wall is not limited to such a circular shape in lateral cross-section. As an essential structural condition, the restriction wall has only to have a wall surface, configured to avoid slight rattling motion of holding portion 25 and restrict a radial movement of holding portion 25. For instance, the wall surface of restriction wall 40a may be formed into a circular-arc shape in lateral cross-section. In lieu thereof, restriction wall 40a may be formed circumferentially intermittently rather than continuously.

Also, in the first to sixth embodiments and in the eighth embodiment, O ring 22 may be provided to be kept always in contact with restriction wall 40a. In this case, even when preload portion 26 deflects radially outward owing to an excessively large input load acting on wormshaft 14 and thus the outer peripheral surface of pushing portion 32 is brought into abutment with restriction wall 40a, it is possible to relax impact caused by the abutment therebetween. Thus, it is possible to more certainly prevent impact-noise, caused by the abutment.

In the sixth embodiment, the previously-discussed restriction wall 40a may be formed with engage grooves, which are cut out in given positions conformable to respective protrusion portions 34 for engagement of the engage grooves with the respective protrusion portions. In this case, by the previously-noted engagement, it is possible to certainly retain bearing holder 21, thus more certainly preventing rotary motion of bearing holder 21.

Furthermore, in the seventh embodiment, in the same manner as each of the first to sixth embodiments, bearing holder 21 may be formed with the first annular groove 27 and the second annular groove 33. That is, O ring 22, fitted into these grooves, may be further combined. In this case, the system can cope with a large load inputted into wormshaft 14, and simultaneously it is possible to enhance the durability of bearing holder 21.

Also, each of protrusions 29 may be formed on the outer surface of the upper wall of plug member 23. In this case, such a modification can provide the same operation and effects as the first embodiment.

As set forth above, each of the previously-discussed modifications may be freely combined with each of the embodiments shown and described herein. Such a free or arbitrary combination can provide the same operation and effects as each of the embodiments shown and described herein.

DESCRIPTION OF THE REFERENCE SIGNS

Figure 1:
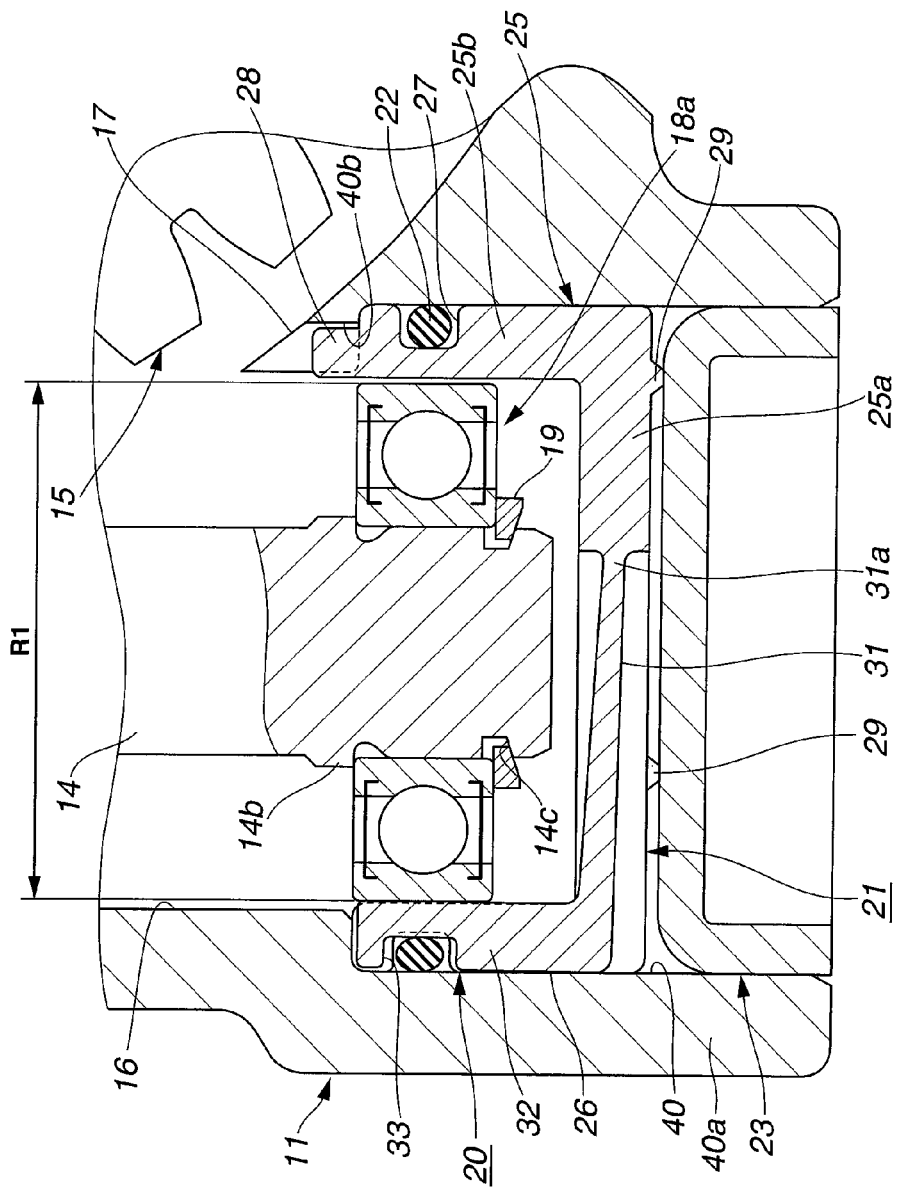
FIG. 1 is an enlarged view illustrating the essential part of the first embodiment of the power steering system, made according to the invention.
Figure 2:
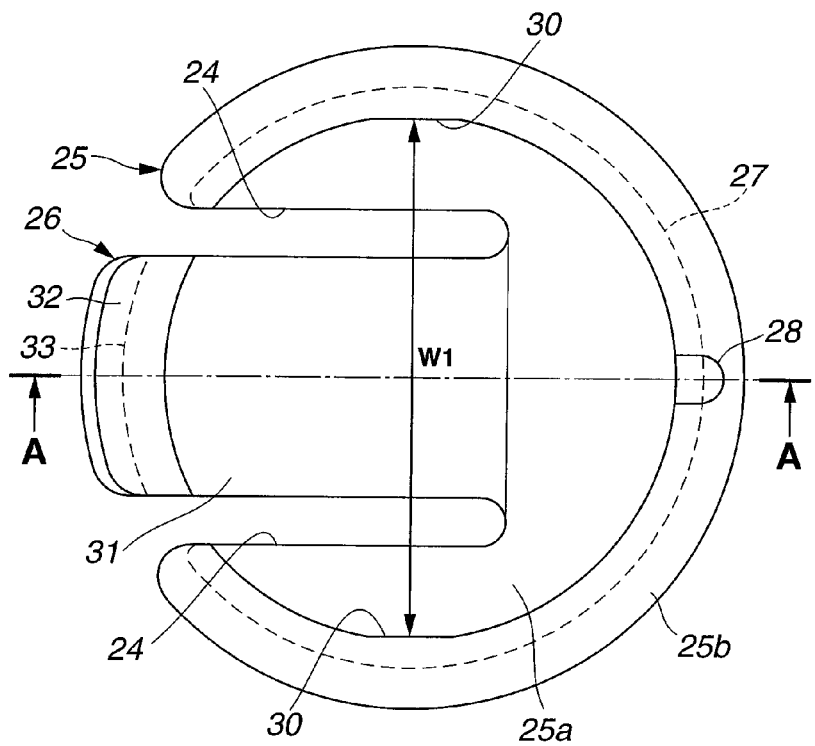
FIG. 2 is a plan view illustrating the bearing holder employed in the power steering system of the first embodiment.
Figure 3:
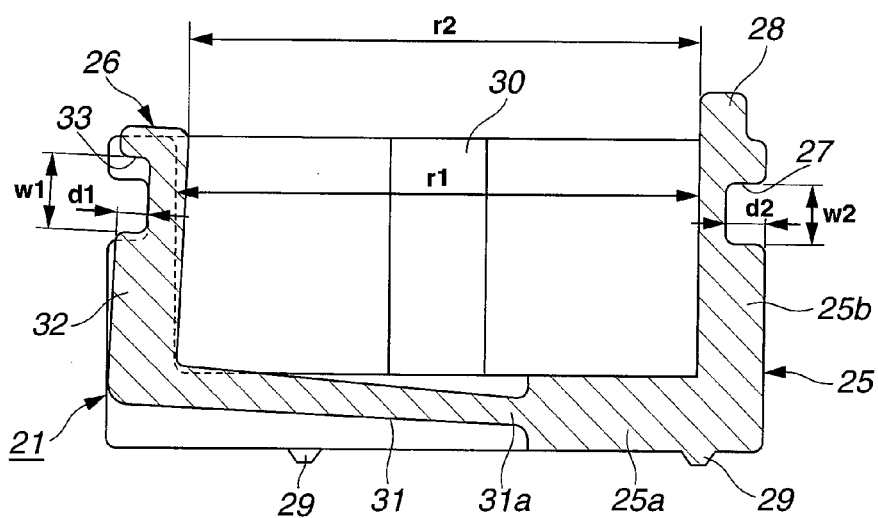
FIG. 3 is a cross-sectional view taken along the line A-A of FIG. 2.
Figure 4:
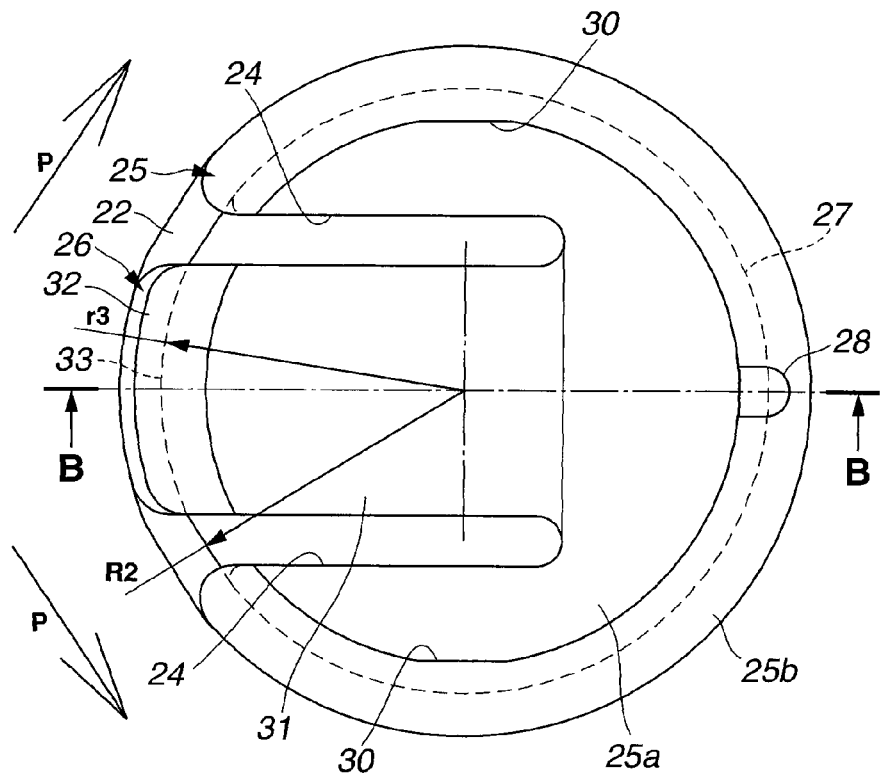
FIG. 4 is a plan view illustrating the O-ring equipped bearing holder of the power steering system of the first embodiment.
Figure 5:
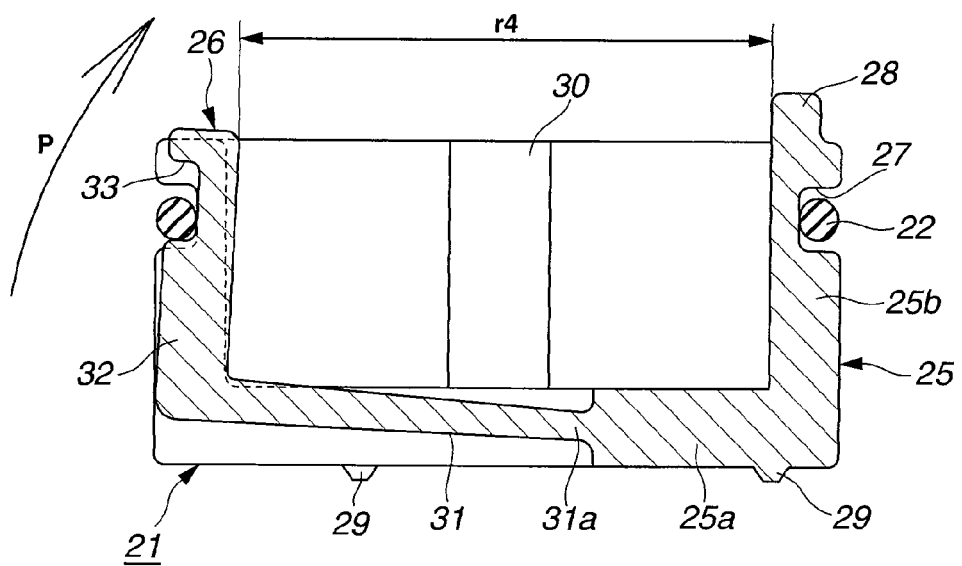
FIG. 5 is a cross-sectional view taken along the line B-B of FIG. 4.
Figure 6:
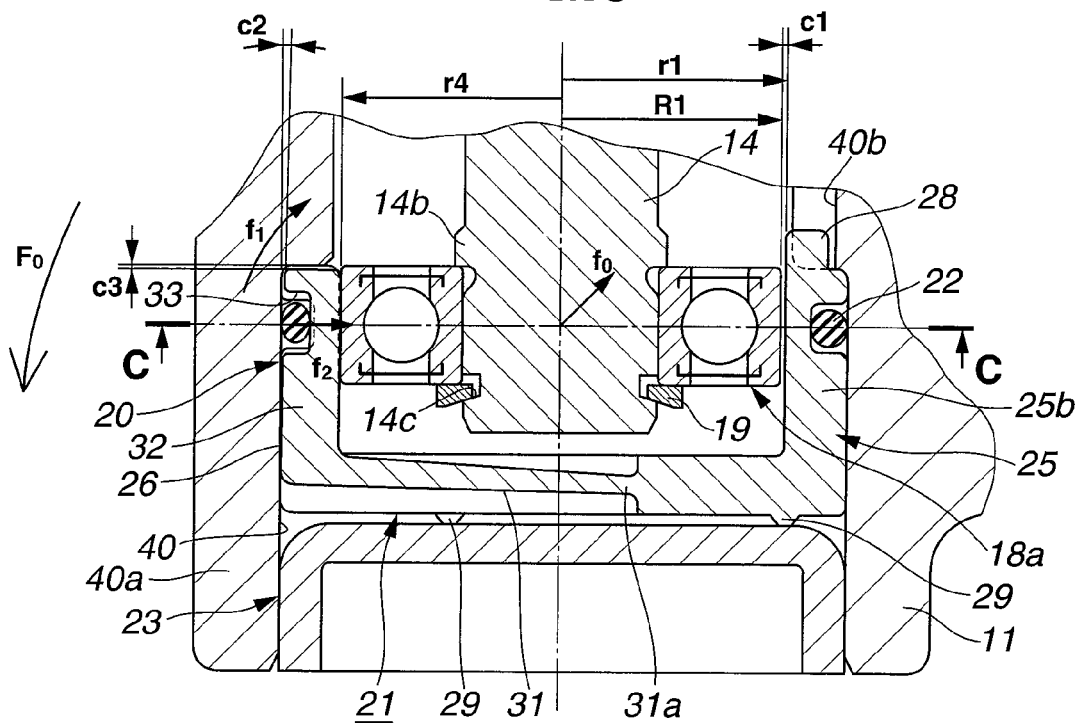
FIG. 6 is a plan view of the backlash adjustment mechanism, illustrating the normal meshing state of the wormshaft in the power steering system of the first embodiment.
Figure 7:
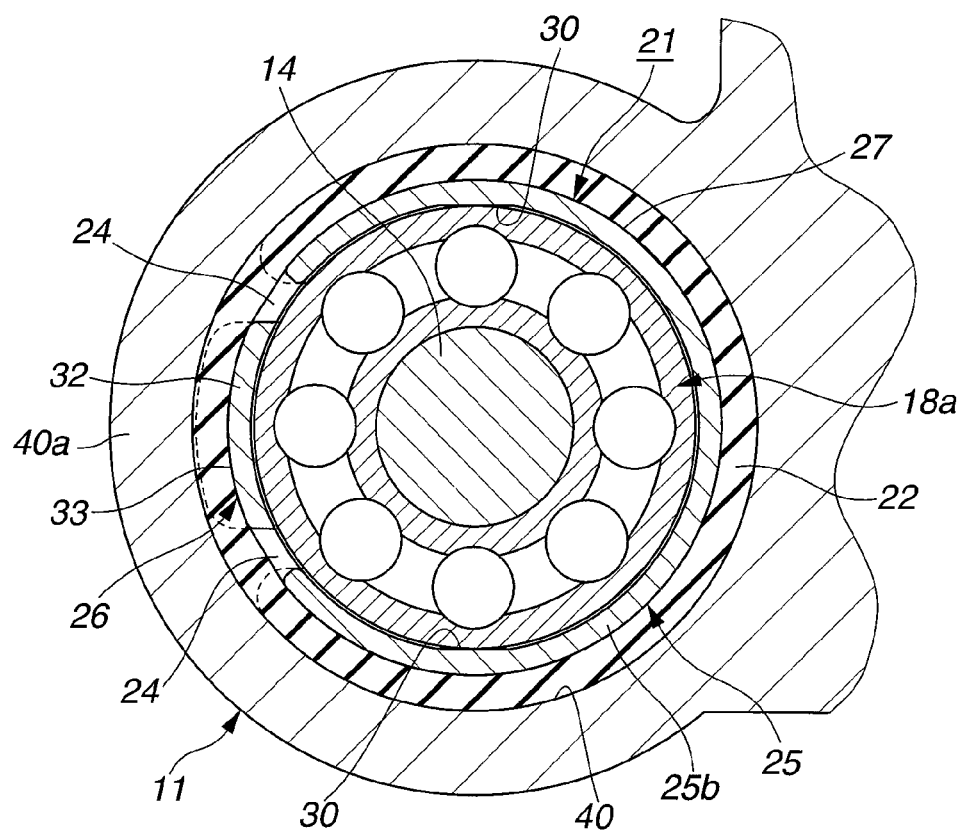
FIG. 7 is a cross-sectional view taken along the line C-C of FIG. 6.
Figure 8:
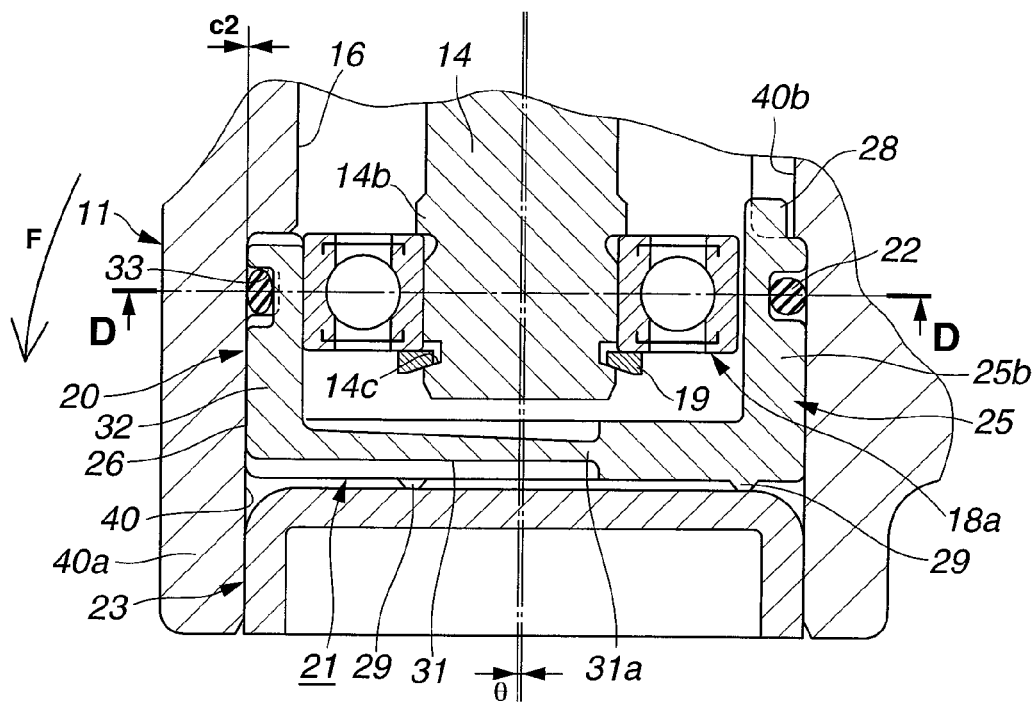
FIG. 8 is a plan view of the backlash adjustment mechanism, illustrating the maximum outward displaced state of the wormshaft in the power steering system of the first embodiment.
Figure 9:
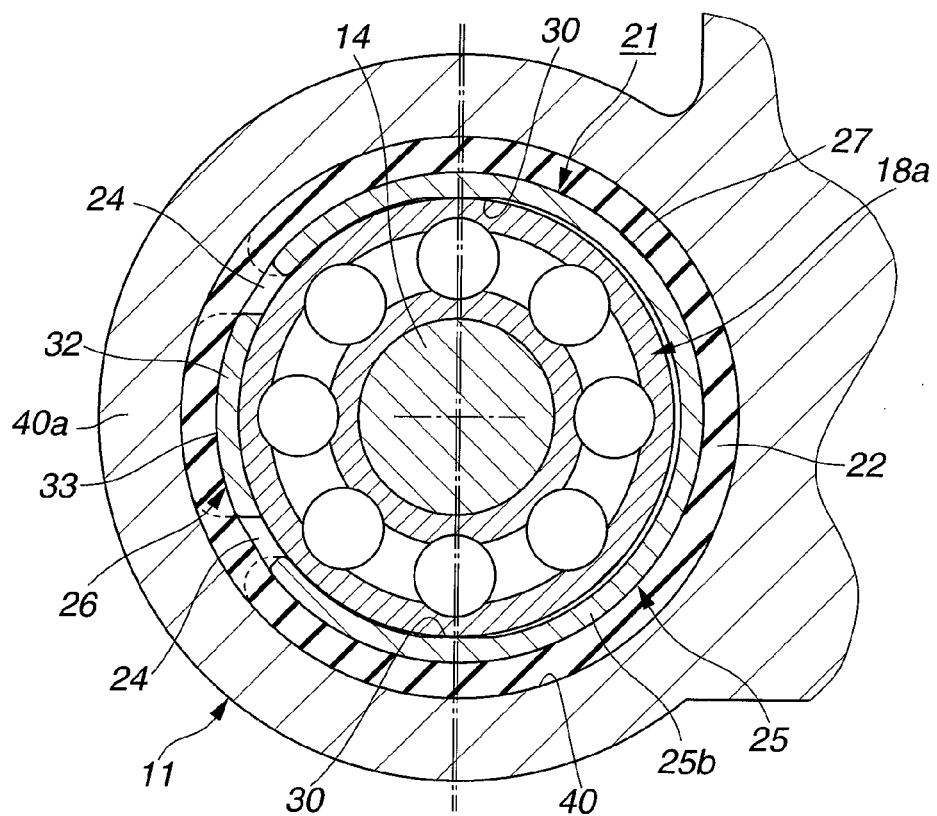
FIG. 9 is a cross-sectional view taken along the line D-D of FIG. 8.
Figure 10:
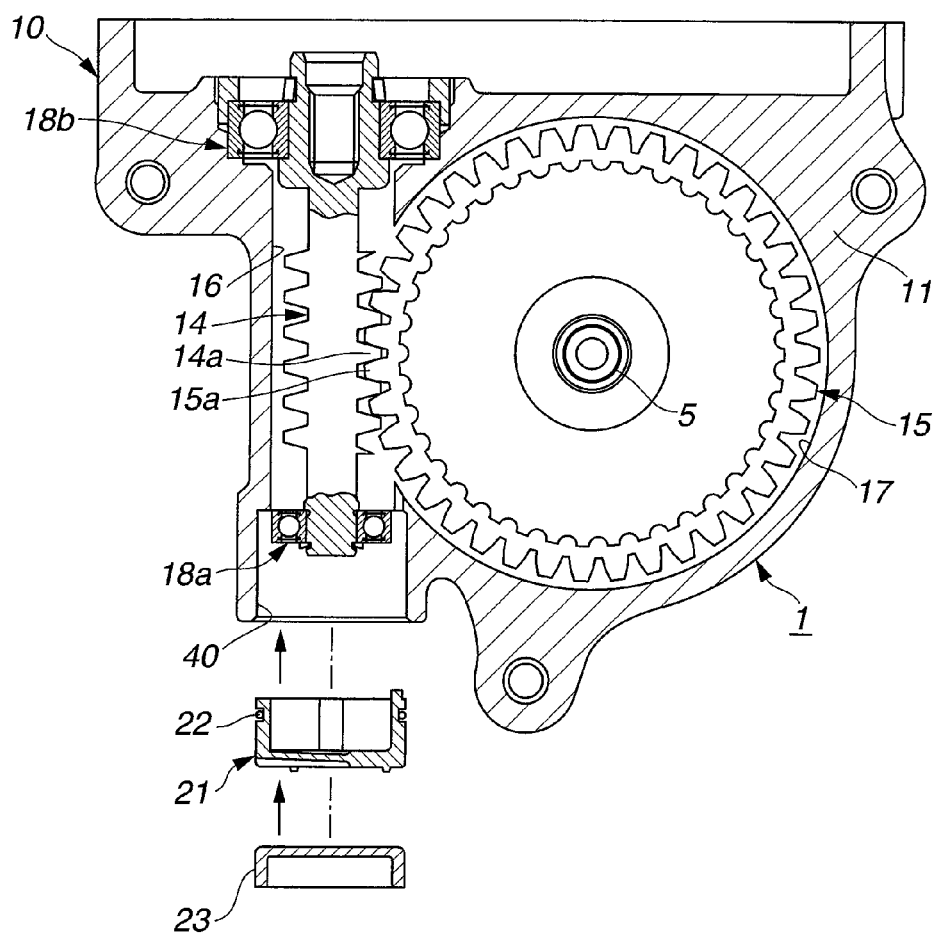
FIG. 10 is a partial cross-sectional view of the system, illustrating the assembling method for the backlash adjustment mechanism in the power steering system of the first embodiment.
Figure 11:
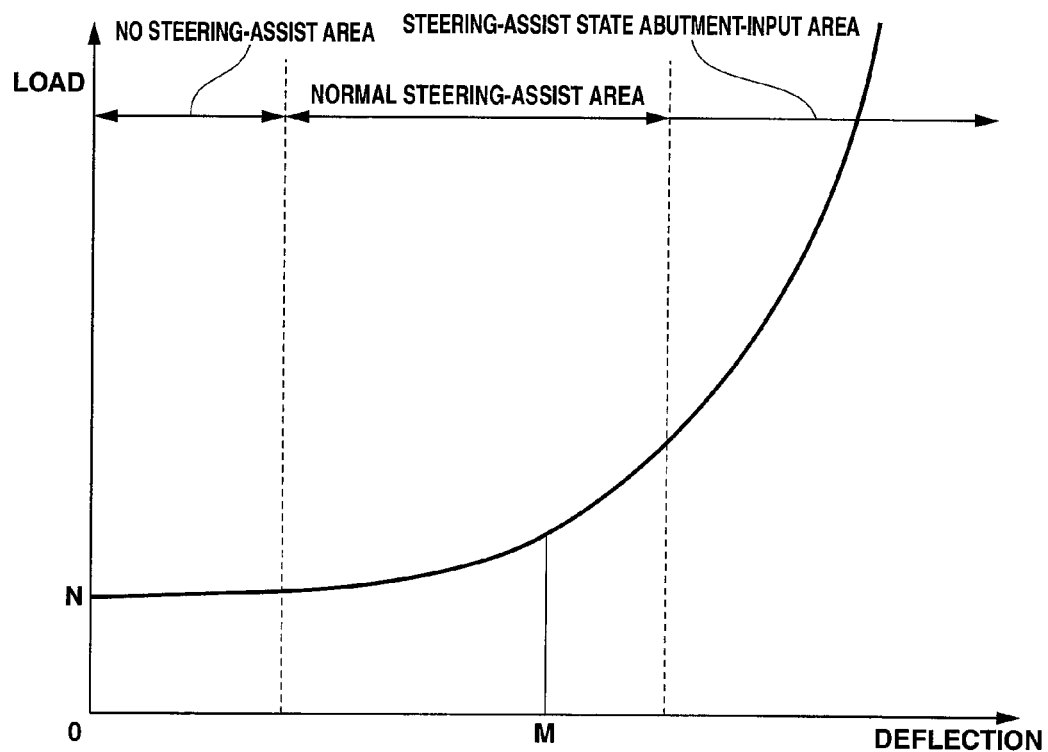
FIG. 11 is a graph illustrating the load-deflection characteristic of the preload portion of the backlash adjustment mechanism in the power steering system of the first embodiment.
Figure 12:
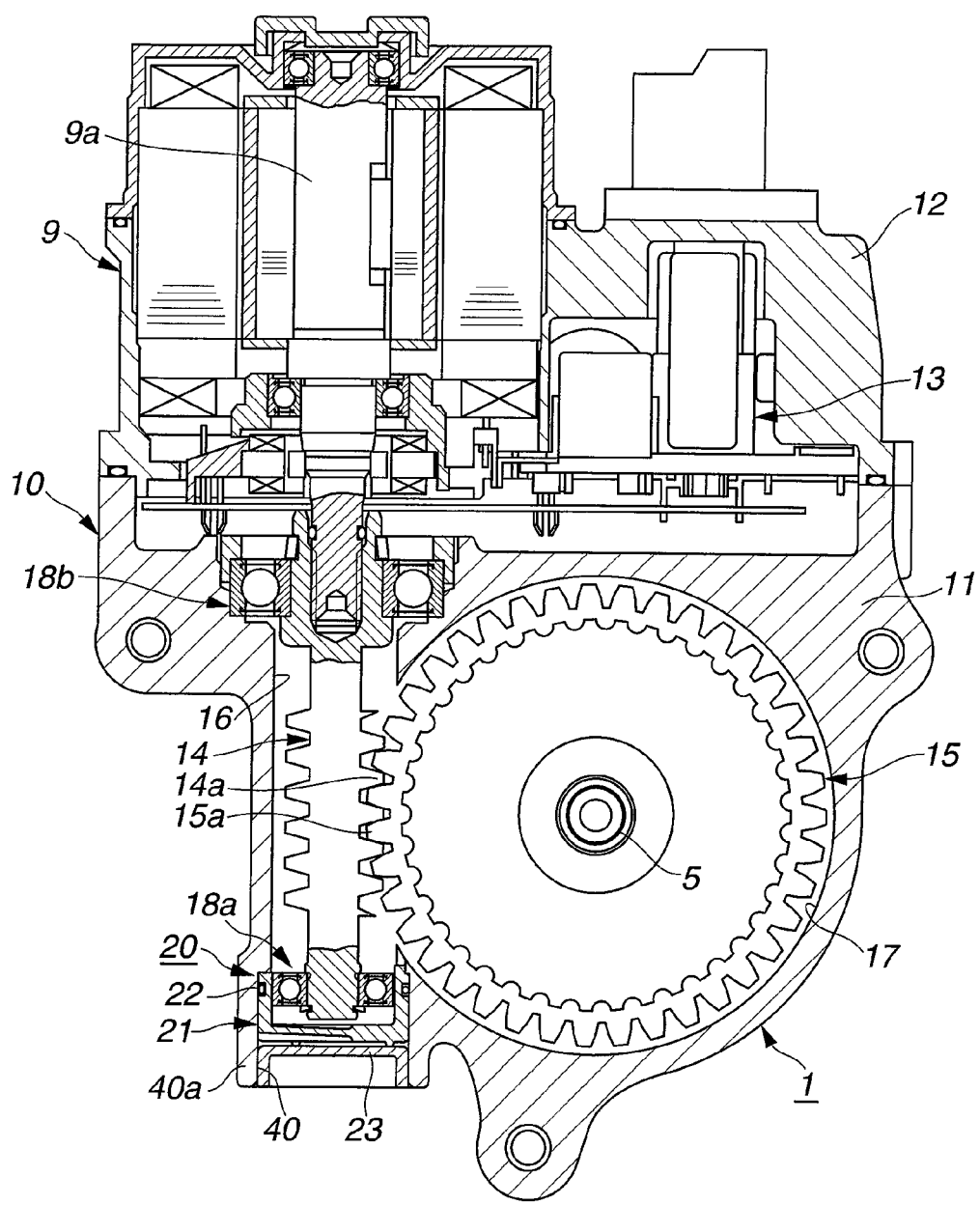
FIG. 12 is a longitudinal cross-sectional view illustrating the speed reduction mechanism in the power steering system of the first embodiment.
Figure 13:
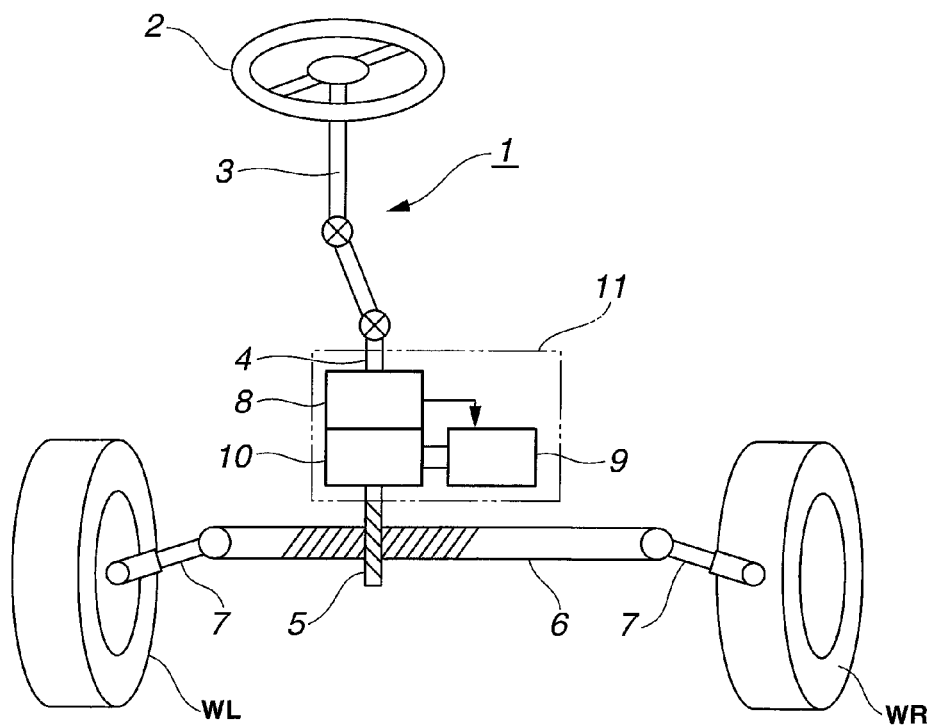
FIG. 13 is a schematic system diagram illustrating the power steering system of each of the embodiments.
Figure 14:
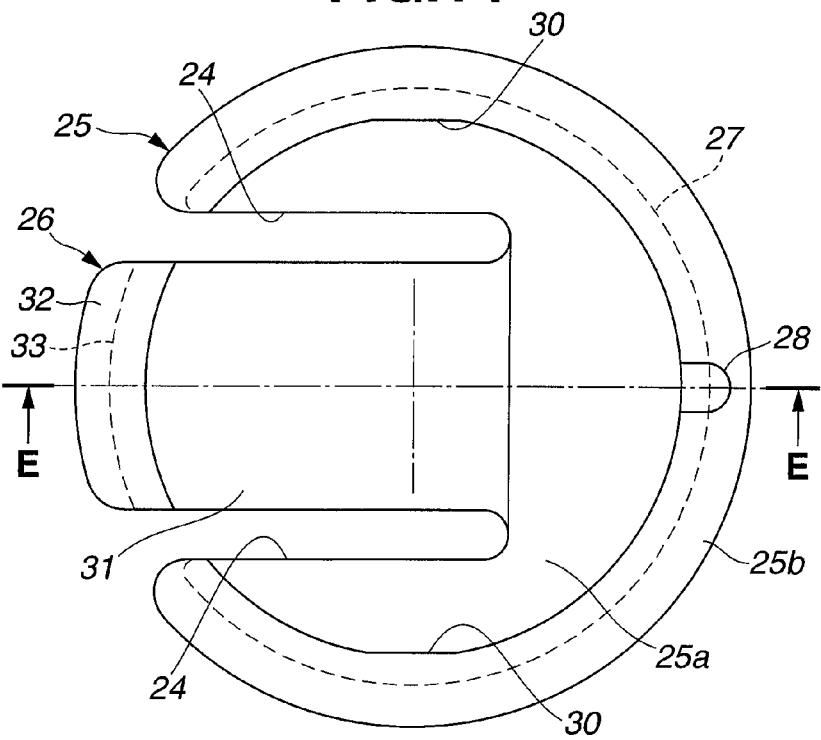
FIG. 14 is a plan view illustrating the bearing holder in the power steering system of the second embodiment.
Figure 15:
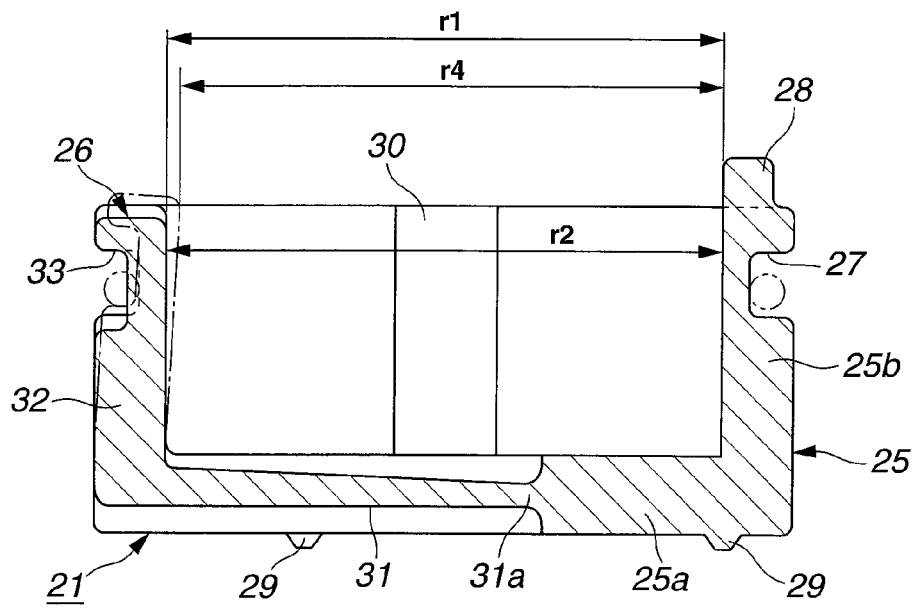
FIG. 15 is a cross-sectional view taken along the line E-E of FIG. 14.
Figure 16:
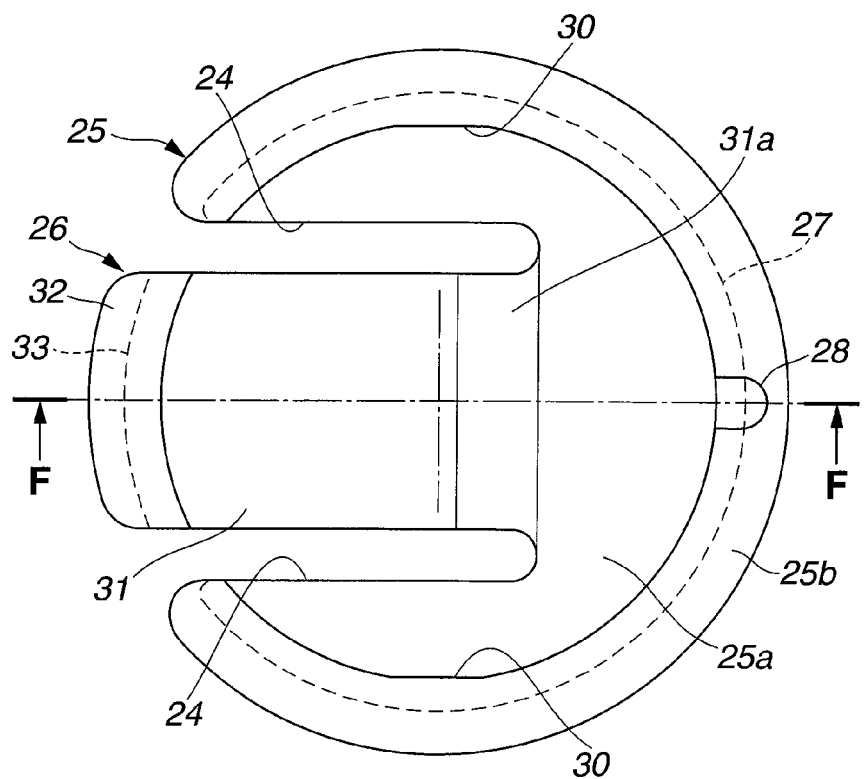
FIG. 16 is a plan view illustrating the bearing holder in the power steering system of the third embodiment.
Figure 17:
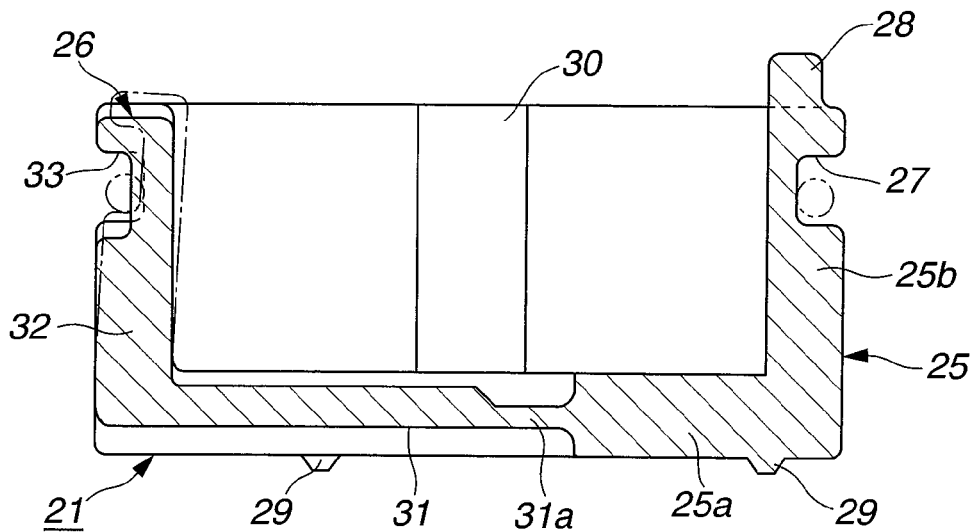
FIG. 17 is a cross-sectional view taken along the line F-F of FIG. 16.
Figure 18:
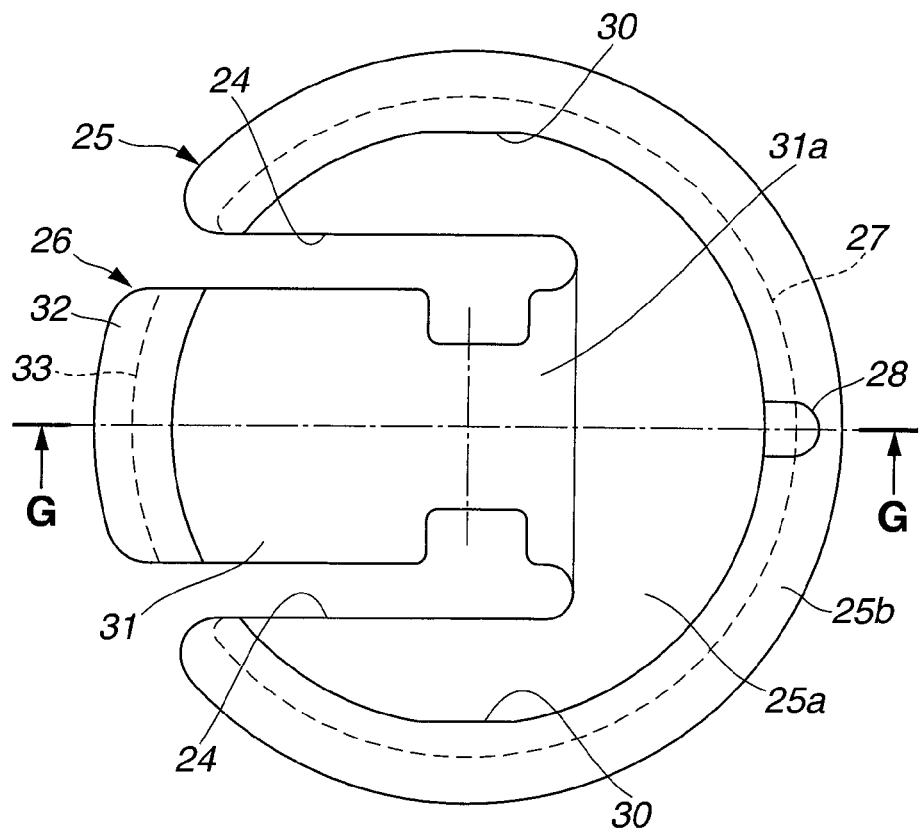
FIG. 18 is a plan view illustrating the bearing holder in the power steering system of the fourth embodiment.
Figure 19:
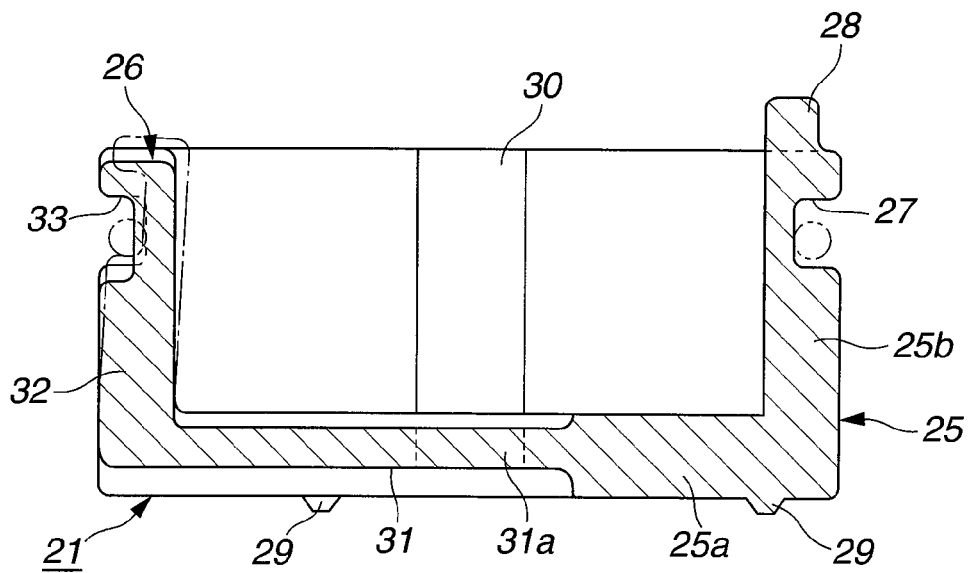
FIG. 19 is a cross-sectional view taken along the line G-G of FIG. 18.
Figure 20:
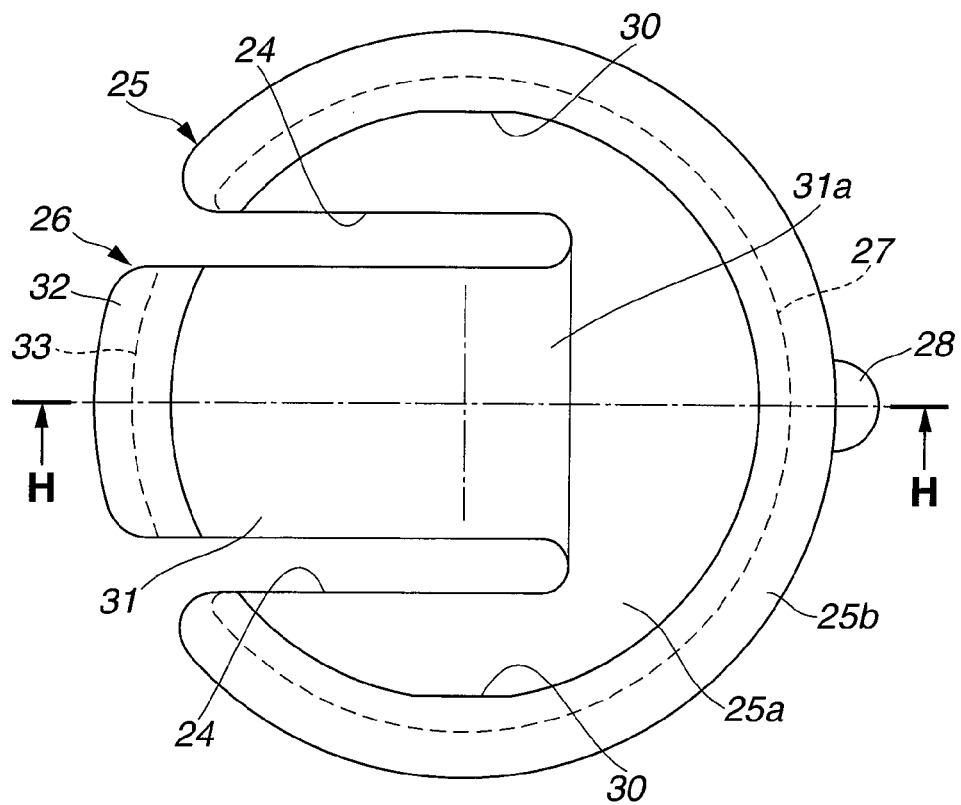
FIG. 20 is a plan view illustrating the bearing holder in the power steering system of the fifth embodiment.
Figure 21:
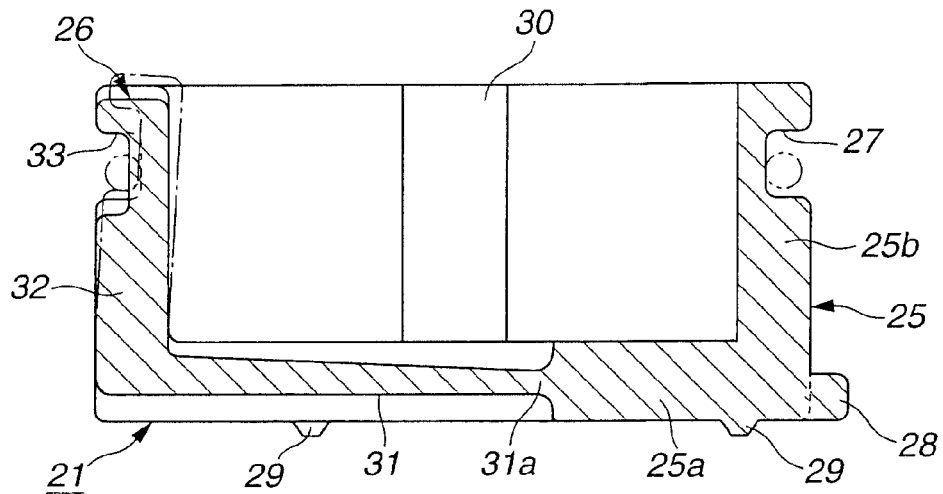
FIG. 21 is a cross-sectional view taken along the line H-H of FIG. 20.
Figure 22:
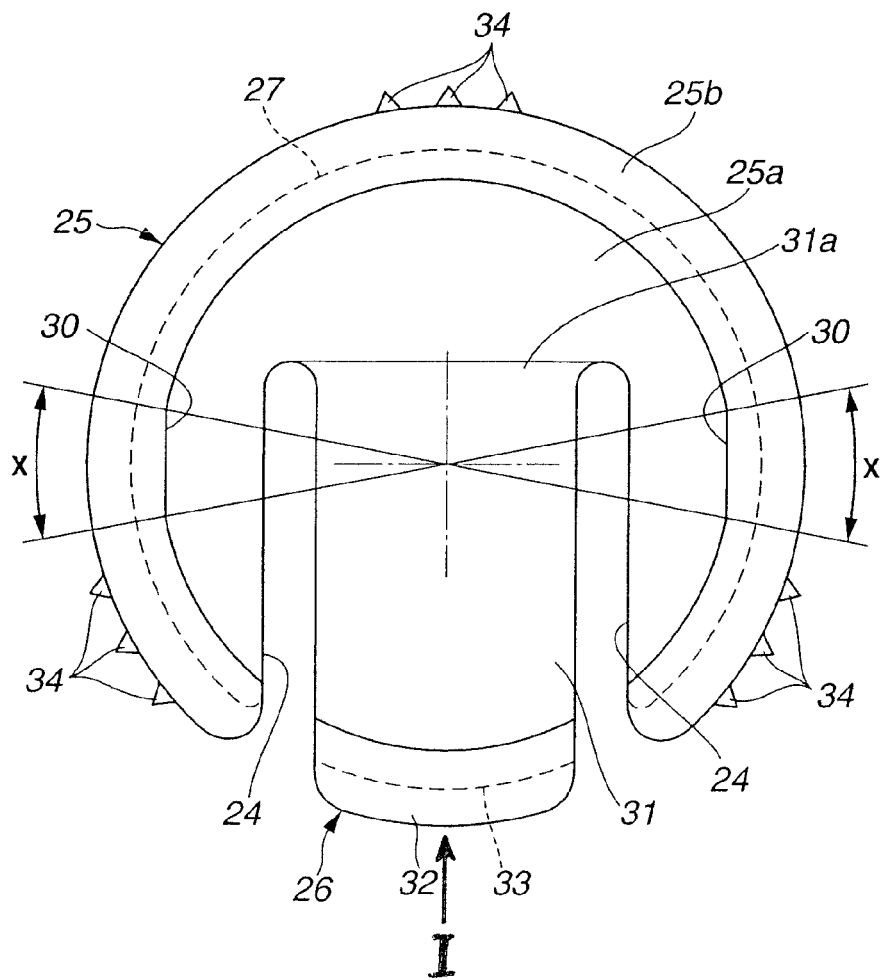
FIG. 22 is a plan view illustrating the bearing holder in the power steering system of the sixth embodiment.
Figure 23:
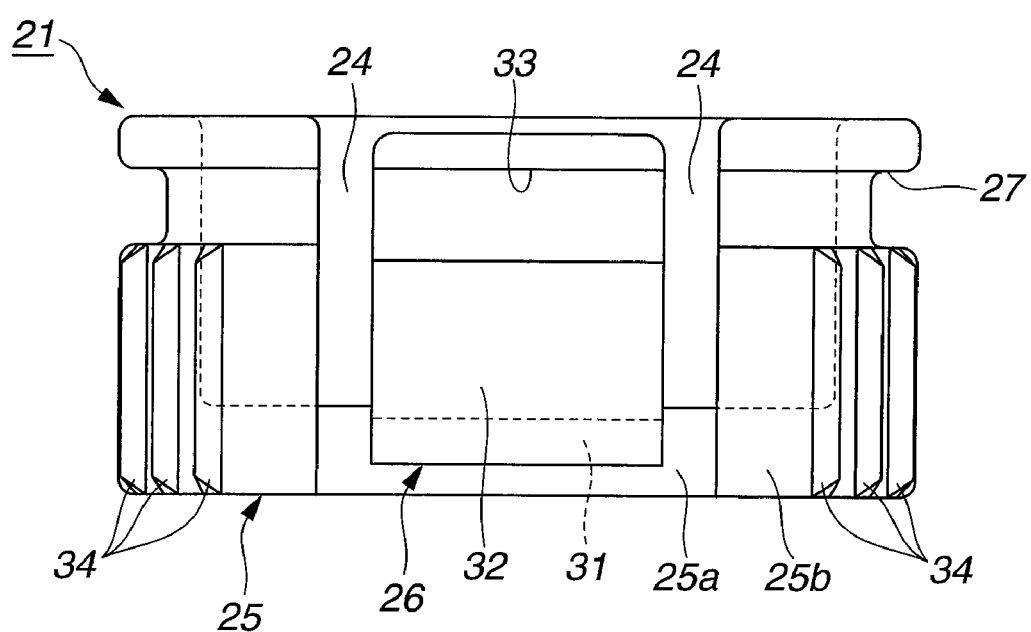
FIG. 23 is a view in the direction of the arrow I in FIG. 22.
Figure 24:
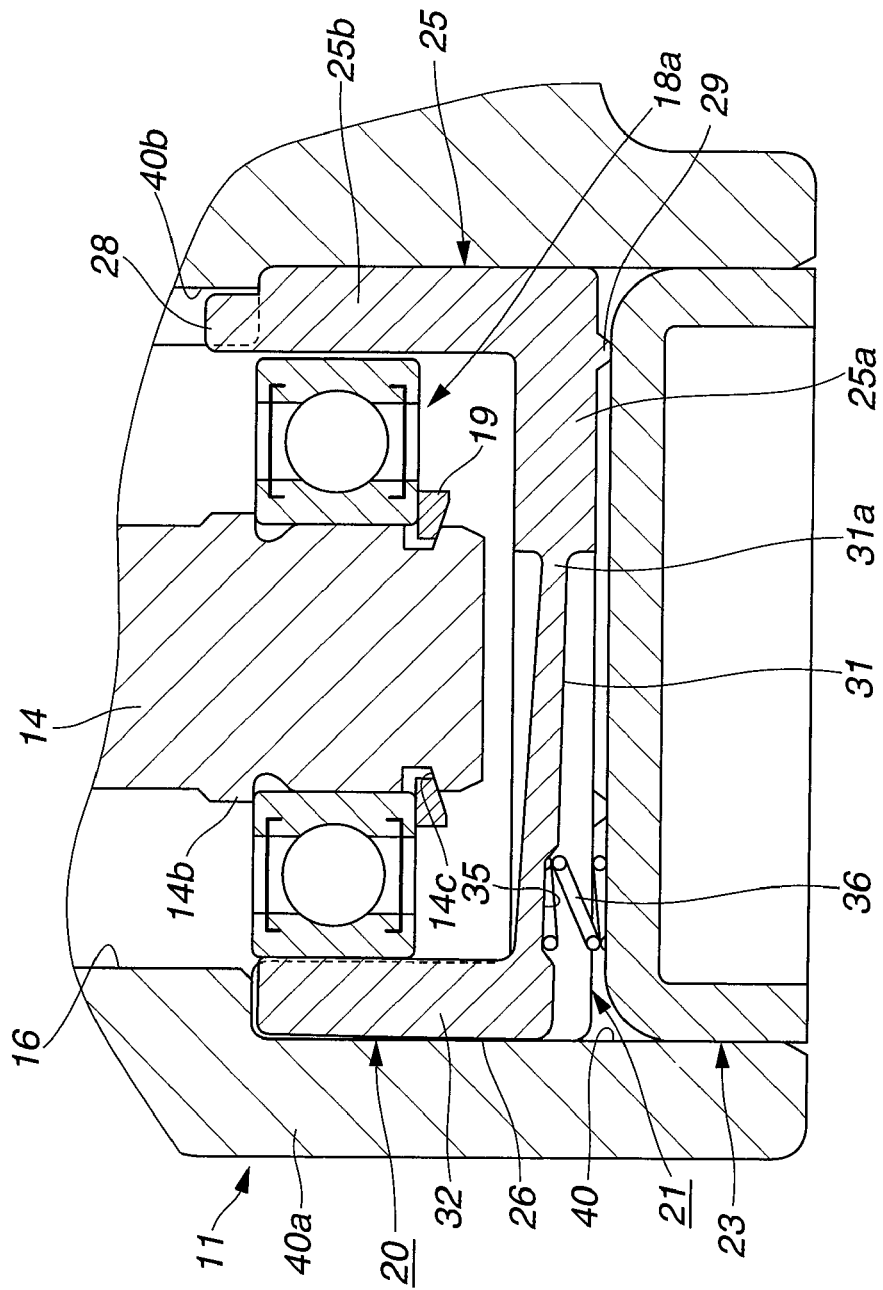
FIG. 24 is an enlarged view illustrating the essential part of the backlash adjustment mechanism in the power steering system of the seventh embodiment.
Figure 25:
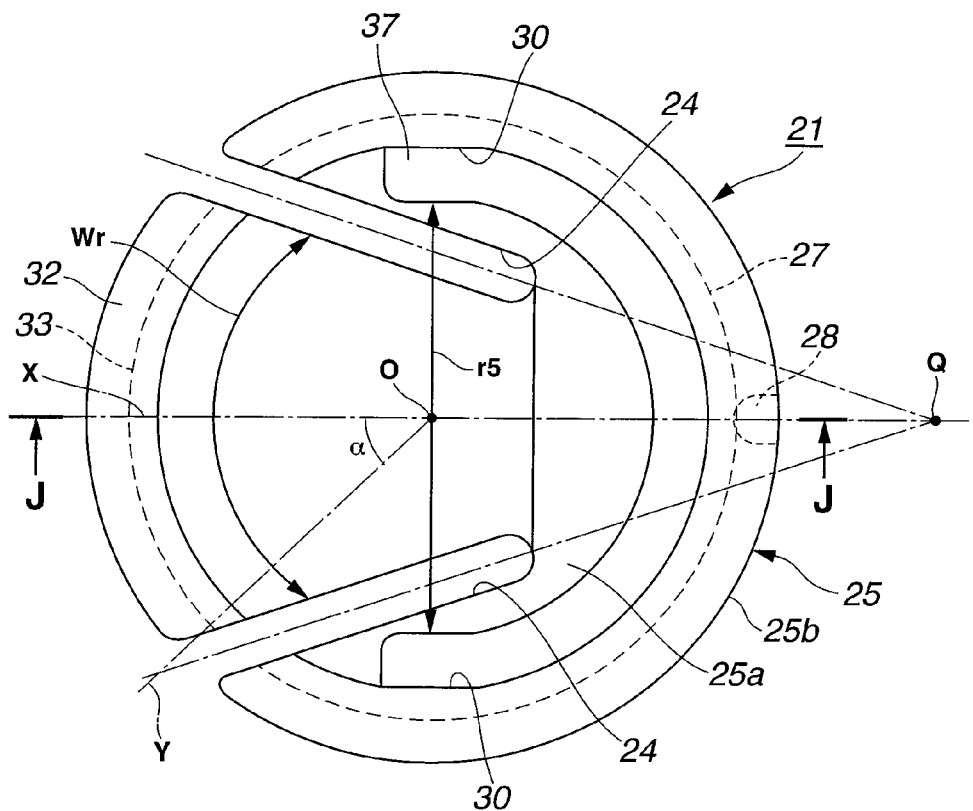
FIG. 25 is a plan view illustrating the bearing holder in the power steering system of the eighth embodiment.
Figure 26:
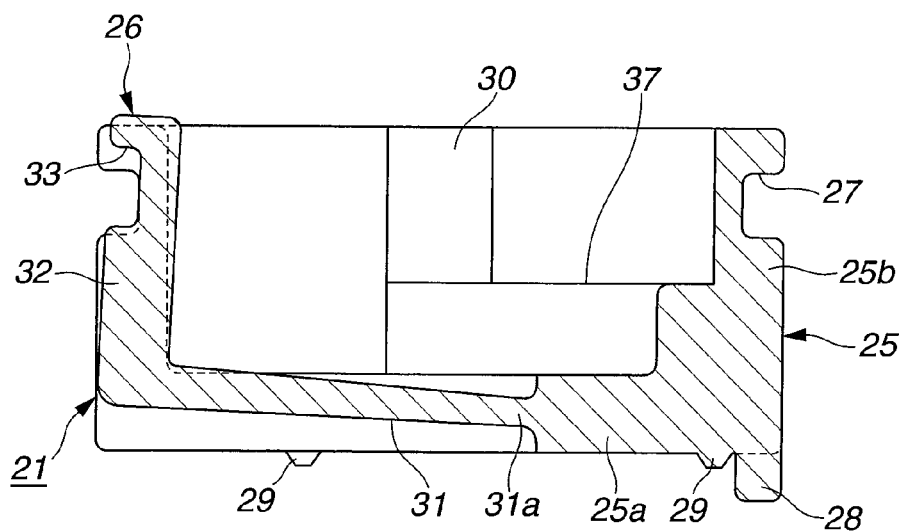
FIG. 26 is a cross-sectional view taken along the line J-J of FIG. 25.
Figure 27:
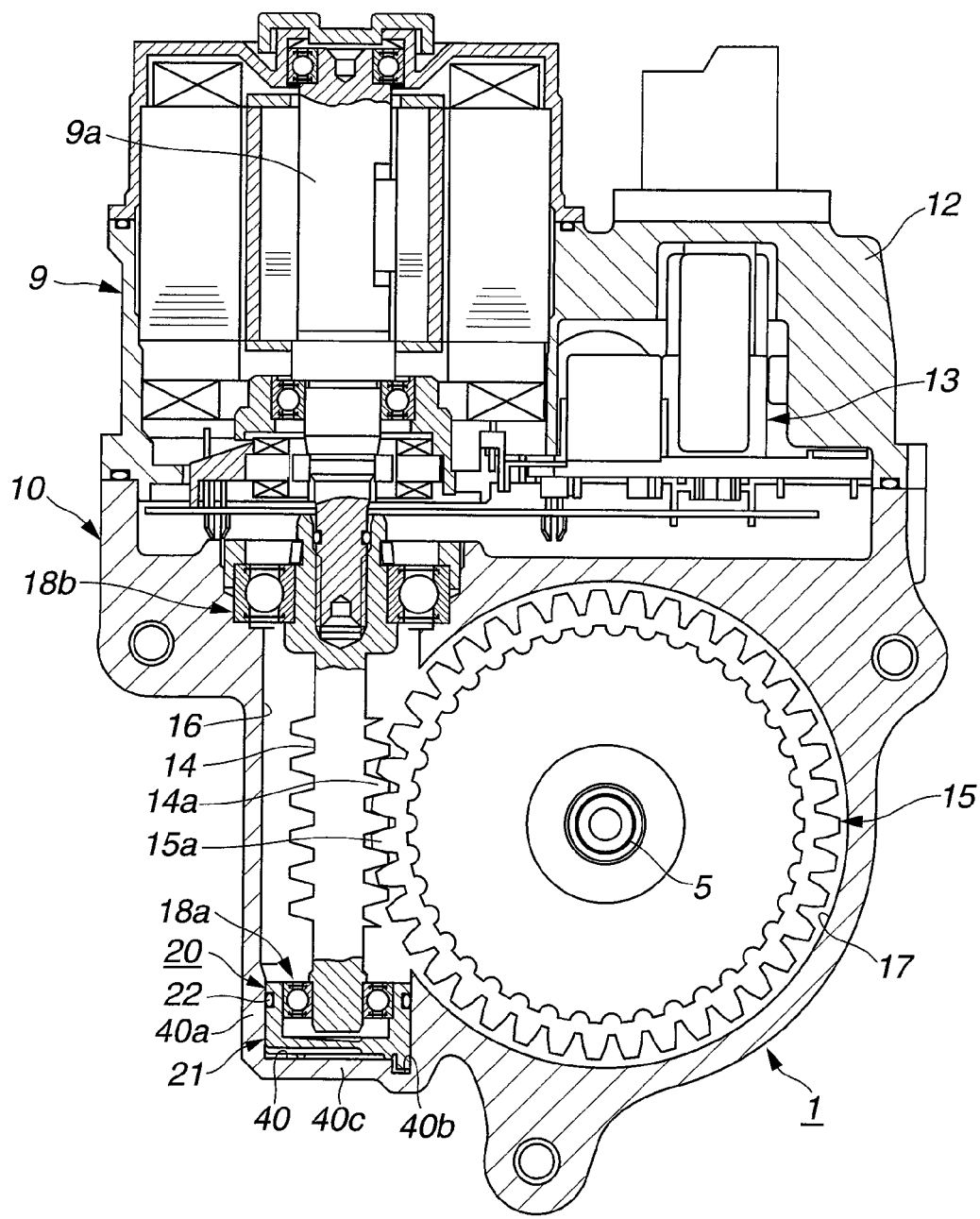
FIG. 27 is a longitudinal cross-sectional view illustrating the speed reduction mechanism in the power steering system of the eighth embodiment.
Figure 28:
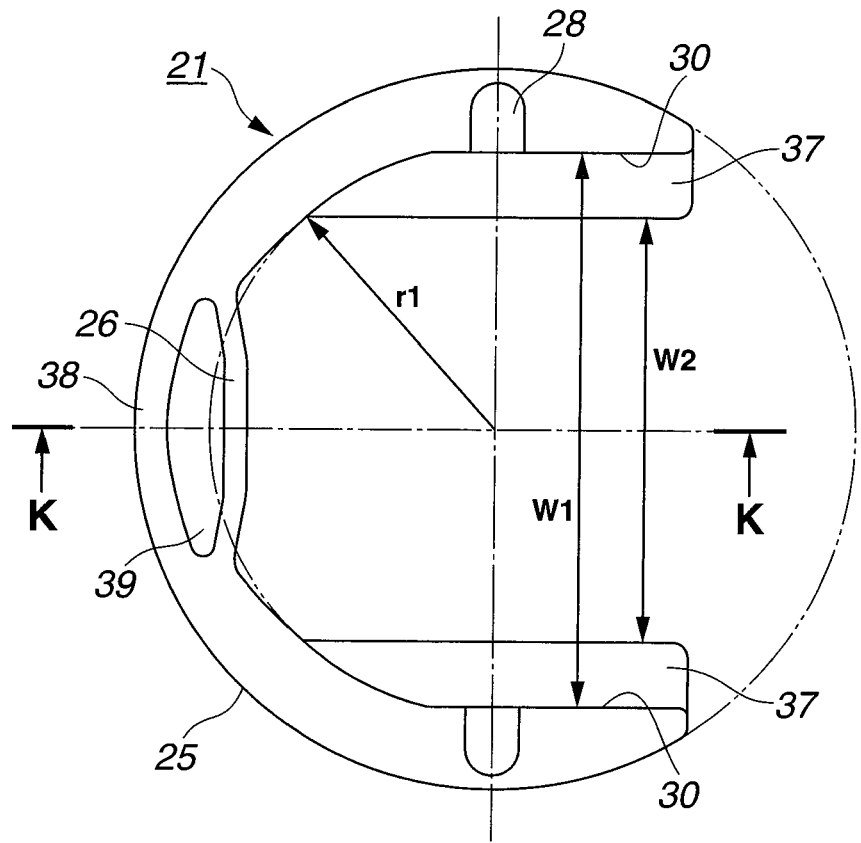
FIG. 28 is a plan view illustrating the bearing holder in the power steering system of the ninth embodiment.
Figure 29:
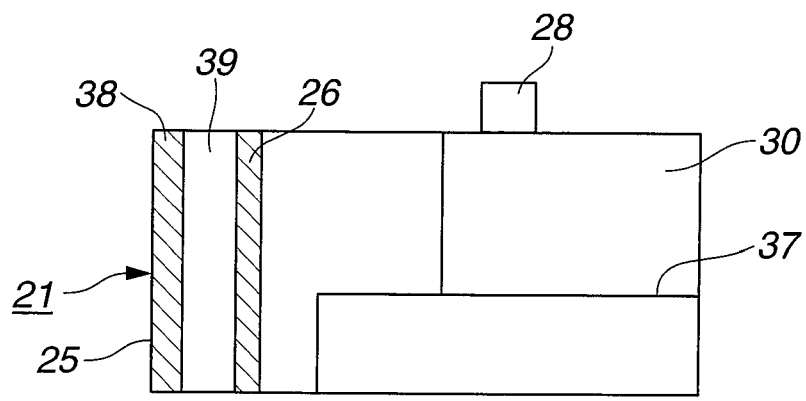
FIG. 29 is a cross-sectional view taken along the line K-K of FIG. 28.
Figure 30:
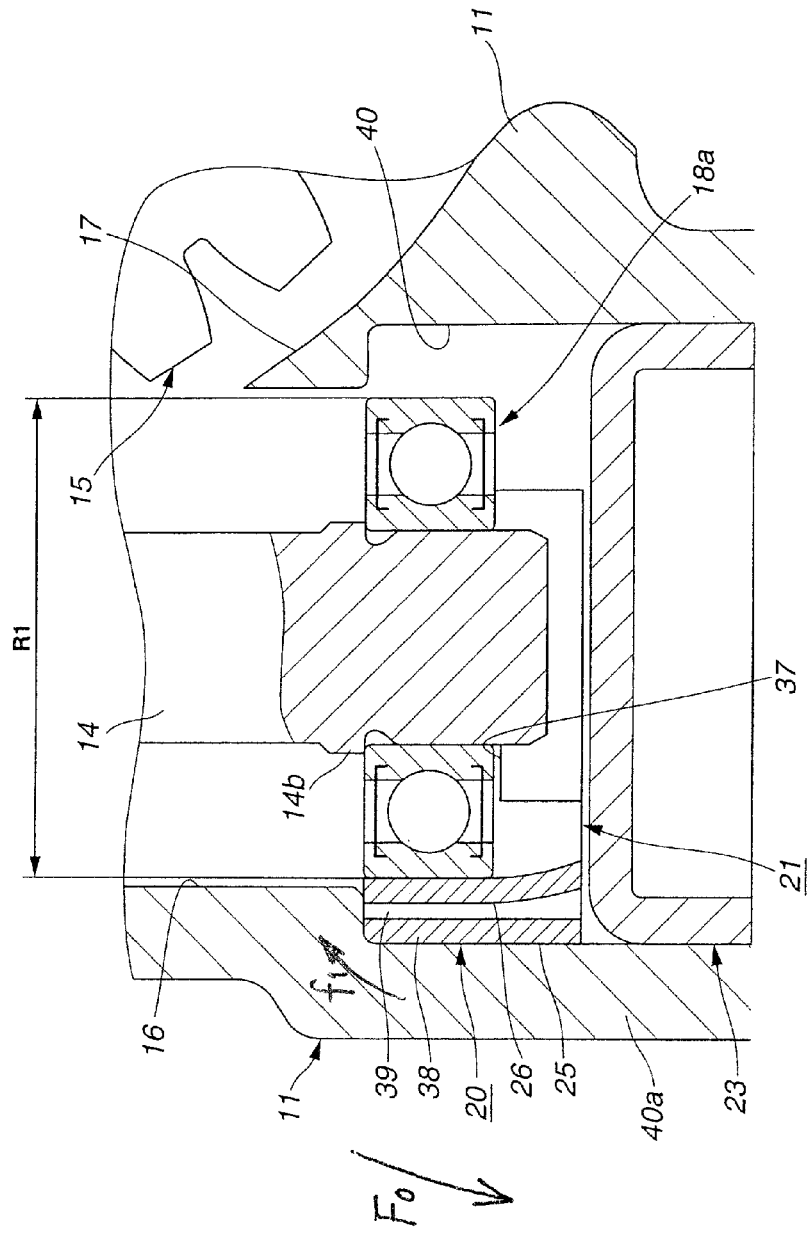
FIG. 30 is an enlarged view illustrating the essential part of the backlash adjustment mechanism in the power steering system of the ninth embodiment.

2 . . . STEERING SHAFT
11 . . . HOUSING
14 . . . WORMSHAFT
15 . . . WORM WHEEL
16 . . . SHAFT HOUSING PORTION
18a . . . FIRST BEARING (BEARING)
21 . . . BEARING HOLDER
22 . . . O RING (PRELOAD MEANS)
25 . . . HOLDING PORTION
40 . . . ADJUSTMENT-MECHANISM HOUSING PORTION
40a . . . RESTRICTION WALL

What is claimed is:

1. A power steering system comprising:
a worm wheel linked to a steering shaft;
a wormshaft housed in a housing and adapted to mesh with the worm wheel;
a bearing adapted to rotatably support one end of the wormshaft;
a bearing holder having a substantially cylindrical holding portion formed to enclose and fit onto the bearing for holding the bearing; and
a preloading means located in the bearing holder for preloading the bearing in a direction that the wormshaft and the worm wheel are brought into meshed-engagement with each other,
wherein a shaft housing portion is defined in the housing for housing the wormshaft inside of the housing;
a holder housing portion is provided at one axial end of the shaft housing portion for housing the bearing holder;
the holder housing portion has a restriction wall for restricting a movement of the bearing holder at least in an opposite direction, which is opposite to the direction that the wormshaft and the worm wheel are brought into meshed-engagement with each other, and in a direction perpendicular to the opposite direction;
an inner peripheral surface of the holder housing portion, defined by the restriction wall, is formed into a substantially circular shape in lateral cross-section, and a central axis of the inner peripheral surface of the holder housing portion and a central axis of an inner peripheral surface of the shaft housing portion are configured to substantially coincide with each other; and the preloading means comprises a preload portion formed integral with the holding portion of the bearing holder to permit elastic deformation of the preload portion, for forcing the bearing in the direction that the wormshaft and the worm wheel are brought into meshed-engagement with each other, by a force of resiliency of the preload portion.

2. The power steering system as claimed in claim 1, wherein:

the bearing is movably housed in the bearing holder; and the preload means is located on an outer circumference of the bearing holder for preloading the bearing through the bearing holder.

3. The power steering system as claimed in claim 1, wherein:

the bearing holder is formed of a synthetic resin.

4. The power steering system as claimed in claim 1, further comprising:

a preload member adapted to be kept in resilient-contact with an outer surface of the preload portion, for assisting a preload of the preload portion.

5. The power steering system as claimed in claim 4, wherein:

the bearing holder is formed into a substantially cylindrical shape by both the holding portion and the preload portion, and the preload member comprises an O ring fitted to an outer circumference of the bearing holder.

6. The power steering system as claimed in claim 5, wherein:

the preload member is configured to apply a preload to the preload portion by a radial shrinking action of the O ring.

7. The power steering system as claimed in claim 5, wherein:

the O ring is fitted and retained in grooves cut and formed in respective outer circumferences of the holding portion and the preload portion.

8. The power steering system as claimed in claim 1, wherein:

the bearing holder has a bottom wall and a peripheral wall formed to extend upward from a circumference of the bottom wall for retaining an outer peripheral surface of the bearing, and the preload portion is supported by the bottom wall of the holding portion via a pair of slits, which slits are radially cut out and formed to range from the peripheral wall of the bearing holder to a predetermined position of the bottom wall.

9. The power steering system as claimed in claim 8, wherein:

the pair of slits are formed such that a circumferential width of the preload portion gradually enlarges radially outward from a basal-end portion of the preload portion formed integral with the bottom wall of the holding portion.

10. The power steering system as claimed in claim 8, wherein:

a stiffness of a basal-end portion of a bottom of the preload portion is set to be less than a stiffness of an outermost-end portion of the bottom of the preload portion.

11. The power steering system as claimed in claim 1, wherein:

the preload portion has a plurality of spring-stiffness characteristic values for a load-deflection characteristic with regard to an input load.

12. A speed reduction mechanism comprising:

a first gear housed in a housing and rotated by an actuator;

a second gear adapted to mesh with the first gear;

a bearing adapted to rotatably support at least one end of the first gear;

a bearing holder having a substantially cylindrical holding portion foamed to enclose and fit onto the bearing for holding the bearing; and a preloading means located in the bearing holder for preloading the bearing in a direction that the first gear and the second gear are brought into meshed-engagement with each other, wherein a first gear housing portion is defined in the housing for housing the first gear inside of the housing;

a holder housing portion is provided at one axial end of the first gear housing portion for housing the bearing holder;

the holder housing portion has a restriction wall for restricting a movement of the bearing holder at least in an opposite direction, which is opposite to the direction that the first gear and the second gear are brought into meshed-engagement with each other, and in a direction perpendicular to the opposite direction;

an inner peripheral surface of the holder housing portion, defined by the restriction wall, is formed into a substantially circular shape in lateral cross-section, and a central axis of the inner peripheral surface of the holder housing portion and a central axis of an inner peripheral surface of the first gear housing portion are configured to substantially coincide with each other; and the preloading means comprises a preload portion formed integral with the holding portion of the bearing holder to permit elastic deformation of the preload portion, for forcing the bearing in the direction that the wormshaft and the worm wheel are brought into meshed-engagement with each other, by a force of resiliency of the preload portion.

13. The speed reduction mechanism as claimed in claim 12, wherein:

the bearing holder has a restriction portion provided to restrict an axial movement of the first gear toward the one end of the first gear through the bearing.

14. The speed reduction mechanism as claimed in claim 12, wherein:

the first gear comprises a wormshaft, whereas the second gear comprises a worm wheel; and the worm wheel is formed of a synthetic resin.

15. The speed reduction mechanism as claimed in claim 12, further comprising:

a preload member installed on the bearing holder, for assisting a preload of the preload means.

16. The speed reduction mechanism as claimed in claim 15, wherein:

the preload member comprises an O ring fitted to an outer circumference of the bearing holder.

* * * * *